(12) United States Patent
Nishimura

(10) Patent No.: US 8,061,894 B2
(45) Date of Patent: Nov. 22, 2011

(54) TEMPERATURE DETECTION CIRCUIT AND SEMICONDUCTOR DEVICE

(75) Inventor: Kouichi Nishimura, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 220 days.

(21) Appl. No.: 11/882,429

(22) Filed: Aug. 1, 2007

(65) Prior Publication Data

US 2008/0031304 A1   Feb. 7, 2008

(30) Foreign Application Priority Data

Aug. 2, 2006  (JP) .................................. 2006-211342
Jun. 11, 2007  (JP) .................................. 2007-153547

(51) Int. Cl.
*G01K 7/00* (2006.01)
(52) U.S. Cl. ........................ 374/170; 374/178
(58) Field of Classification Search ............... 374/178, 374/170, E7.035; 323/313–316
See application file for complete search history.

(56) References Cited

U.S. PATENT DOCUMENTS

| | | | | |
|---|---|---|---|---|
| 4,480,312 A | * | 10/1984 | Wingate | 702/130 |
| 5,521,489 A | * | 5/1996 | Fukami | 323/313 |
| 5,867,035 A | * | 2/1999 | Nishimura | 323/315 |
| 6,218,889 B1 | * | 4/2001 | Fujiki et al. | 327/427 |
| 6,621,235 B2 | * | 9/2003 | Chang | 315/216 |
| 6,911,858 B2 | * | 6/2005 | Mori | 327/307 |
| 6,937,001 B2 | * | 8/2005 | Ueda | 323/313 |
| 6,946,905 B2 | * | 9/2005 | Kokubun et al. | 330/9 |
| 6,965,334 B2 | * | 11/2005 | May et al. | 341/144 |
| 7,057,459 B2 | * | 6/2006 | Ueno | 330/255 |

(Continued)

FOREIGN PATENT DOCUMENTS

JP   05036793 A  *  2/1993

(Continued)

OTHER PUBLICATIONS

HyperPhysics I. "Voltage Follower" Sep. 2, 2004. <http://web.archive.org/web/20040902222609/http://hyperphysics.phy-astr.gsu.edu/Hbase/electronic/opampvar2.html>.*

(Continued)

*Primary Examiner* — Lisa Caputo
*Assistant Examiner* — Jonathan Dunlap
(74) *Attorney, Agent, or Firm* — McGinn IP Law Group, PLLC

(57) ABSTRACT

To provide a temperature detection circuit and a semiconductor device capable of accurately detecting temperatures. A temperature detection circuit 10 includes a group of diodes 11 connected in series, a constant current source I1 connected to the group of diodes 11, a BGR circuit 13, an amplifier 14 for amplifying the BGR voltage, an adder 12 for subtracting a comparison voltage VD generated by the group of diodes 11 from a reference voltage serving as an output of the amplifier 14, a voltage current converter 15 for converting the output voltage of the adder 12 into the current, and a resistor R2 for converting its output current into the voltage. The reference voltage VA2 is a BGR voltage VBGR amplified by the same voltage as the comparison voltage VD at a predetermined temperature T1.

20 Claims, 18 Drawing Sheets

U.S. PATENT DOCUMENTS

| | | | |
|---|---|---|---|
| 7,253,679 B2 * | 8/2007 | Nishimori .................. | 330/9 |
| 7,321,246 B2 * | 1/2008 | Nishimura ................ | 327/112 |
| 7,323,793 B2 * | 1/2008 | Blackall et al. ............ | 307/33 |
| 7,350,974 B2 * | 4/2008 | Mikuni et al. ............. | 374/178 |
| 7,358,946 B2 * | 4/2008 | Kokubun et al. .......... | 345/87 |
| 7,405,622 B2 * | 7/2008 | Nishimura et al. ........ | 330/255 |
| 7,408,402 B2 * | 8/2008 | Nishimura ................ | 330/9 |
| 7,535,302 B2 * | 5/2009 | Nishimura et al. ........ | 330/255 |
| 7,540,657 B2 * | 6/2009 | Mikuni et al. ............. | 374/178 |
| 2006/0208961 A1 * | 9/2006 | Nathan et al. ............. | 345/44 |
| 2008/0013597 A1 * | 1/2008 | Mikuni et al. ............. | 374/178 |
| 2008/0122759 A1 * | 5/2008 | Levey ....................... | 345/78 |
| 2009/0168840 A1 * | 7/2009 | Song et al. ................ | 374/170 |

FOREIGN PATENT DOCUMENTS

| | | |
|---|---|---|
| JP | 11-258065 | 9/1999 |
| JP | 11249623 A * | 9/1999 |

OTHER PUBLICATIONS

HyperPhysics II. "Amplified Difference" Sep. 2, 2004. <http://web.archive.org/web/20040902222621/http://hyperphysics.phy-astr.gsu.edu/Hbase/electronic/opampvar6.html>.*

* cited by examiner

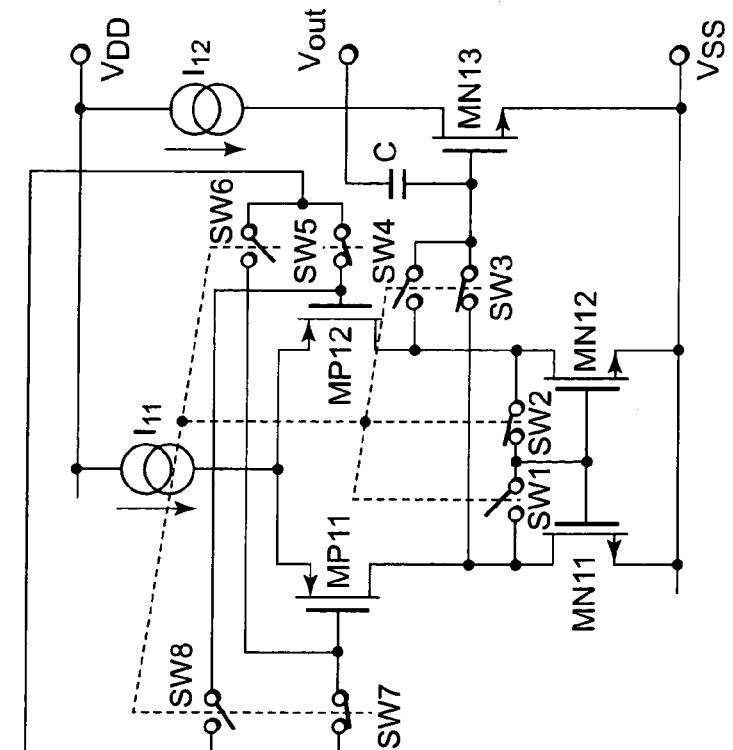
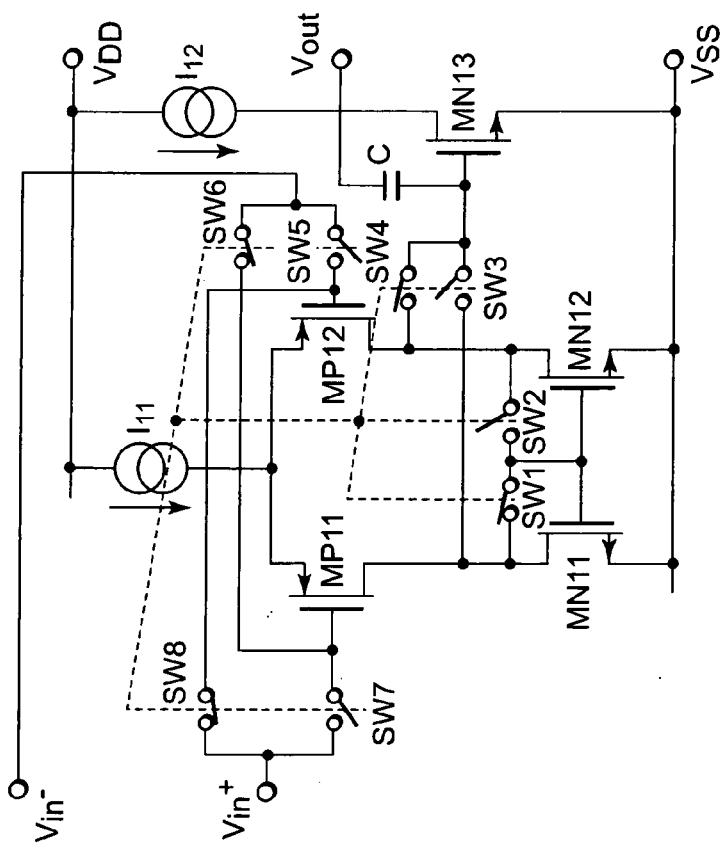
FIG. 7(a)
FIG. 7(b)

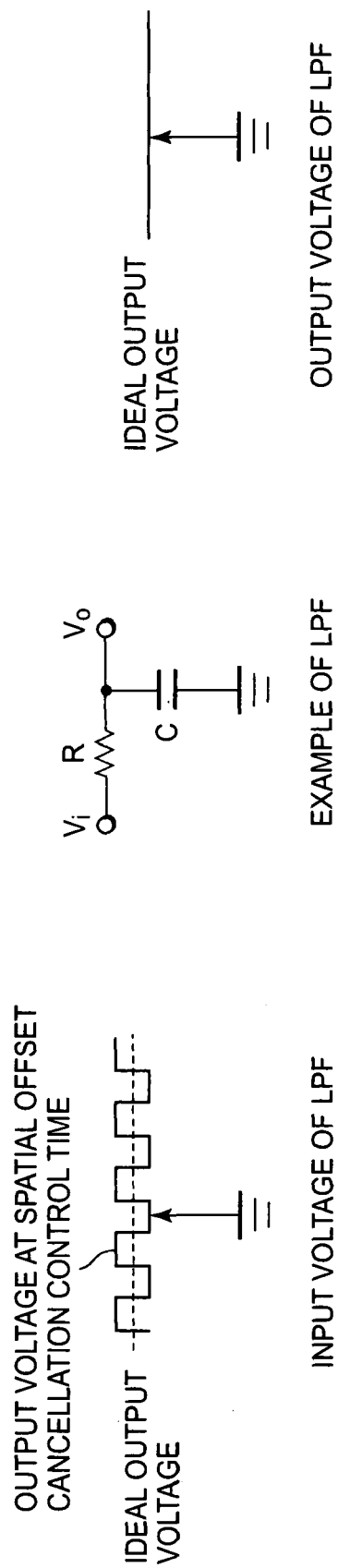
FIG. 8(a) INPUT VOLTAGE OF LPF
FIG. 8(b) EXAMPLE OF LPF
FIG. 8(c) OUTPUT VOLTAGE OF LPF

TEMPERATURE DETECTION CIRCUIT AND SEMICONDUCTOR DEVICE

BACKGROUND OF THE INVENTION

1. Field of the Invention

The present invention relates to a temperature detection circuit, in particular, a temperature detection circuit which outputs a voltage or a current proportional to a chip temperature when a power consumption in a chip such as a power IC is on a high level and the chip temperature is required to be detected, and a semiconductor device mounting this temperature detection circuit.

2. Description of Related Art

In recent years, in general, the integration of LSI has been advanced, and many of circuits are being mounted within one chip. Power consumption is increased in proportion to a scale of the circuit. Alternatively, even when many of circuits are not mounted, a circuit such as a power IC consumes inherently high power. In such a case, the chip temperature rises, and in the worst case, the chip is likely broken down. To avoid this, it is desirable to detect the chip temperature of the semiconductor device and control the system of the semiconductor device, thereby protecting the chip as a result. For example, a temperature sensor is mounted in the semiconductor device. In this case, as the temperature sensor, a circuit (temperature detection circuit) for outputting a voltage or current proportional to the temperature of the semiconductor chip is considered to be mounted.

FIG. 17 shows a graphic chart representing a chip temperature in the axis of abscissas, and an output voltage in the axis of ordinate. The figure shows that the chip temperature and the output voltage are in a directly proportional relationship. As shown in FIG. 17, when the chip temperature is 25° C., the output voltage is 0 V, and when it is 75° C., the output voltage is V1, and when it is 125° C., the output voltage is V2.

Japanese Patent Laid-Open publication No. 11-258065 discloses a temperature detection circuit realizing the characteristics of FIG. 17. FIG. 18 is a circuit diagram showing the temperature detection circuit disclosed in the Publication. As shown in FIG. 18, a temperature detection circuit 210 comprises a band gap reference circuit (hereinafter, referred to as BGR circuit) 213, first and second operational amplifiers A31 and A32, first to fourth resistors R21 to R24, first and second diodes D11 and D12, and a current source I11.

The operational amplifier A32 is inputted with the output voltage of a BGR circuit 113 in a non-inverting input terminal (forward rotation input terminal), and has a resistor R21 connected between the inverting input terminal and a GND, and further, has a resistor R22 connected between the inverting input terminal and the output terminal.

Further, the first diode D11 has its anode connected to the output terminal of the second operational amplifier A32, and has its cathode connected to the anode of the second diode D12. The current source I11 has one end connected to the cathode of the second diode D12, and has the other end connected with the GND. The operational amplifier A31 has the non-inverting input terminal connected to the cathode of the second diode D12, and has a resistor R23 connected between the inverting input terminal and the GND, and further, has a resistor R24 connected between the inverting input terminal and an output terminal VOUT. The output terminal of this operational amplifier A31 is the final output terminal OUT.

When the temperature detection circuit 210 takes the voltage of the BGR circuit 213 as a VBGR, an output voltage VREF of the operational amplifier A32 can be represented by the following formula (1).

[Formula 1]

$$V_{REF} = V_{BGR}\left(1 + \frac{R_{22}}{R_{21}}\right) \quad (1)$$

Since the output voltage VREF is applied to anode sides of the two diodes D11 and D12 connected in series, and is biased by the current source I11, when the current flowing into the current source I11 is taken as a current I11, the cathode voltage VD12k of the diode D12 can be represented in the following formula (2).

[Formula 2]

$$V_{D12K} = V_{BGR}\left(1 + \frac{R_{22}}{R_{21}}\right) - 2\frac{kT}{q}\ln\frac{I_{11}}{I_S} \quad (2)$$

Here is shown a reversed saturation current for the diode, where k: Boltzman's constant, T: the absolute temperature, q: charge of electron, and IS: diode.

Now, it is generally known that the temperature characteristic corresponding to one piece of the diode has a temperature characteristic of an approximately −2 mv/° C. Further, when the BGR circuit 113 is correctly designed, the temperature characteristic, as compared with the temperature characteristic of the diode, can be reduced approximately to the point of ignoring the same. Consequently, to check the temperature characteristic of the formula (2), assuming that the voltage (KT/q)ln(I11/IS) of the diode is −2 mv/° C., the formula (2) is differentiated by a temperature T, and the following formula (3) is established.

[Formula 3]

$$\frac{d}{dT}V_{D12K} \cong +4\,\text{mV/°C}. \quad (3)$$

As a result of amplifying this voltage VD12K by a closed loop gain decided by the operational amplifier A31, the resistor R23, and the resistor R24, the final output voltage Vout becomes as follows.

[Formula 4]

$$V_{out} = V_{D12K}\left(1 + \frac{R_{24}}{R_{23}}\right) \quad (4)$$

$$= \left(1 + \frac{R_{24}}{R_{23}}\right)\left\{V_{BGR}\left(1 + \frac{R_{22}}{R_{21}}\right) - 2\frac{kT}{q}\ln\frac{I_{11}}{I_S}\right\}$$

Further, the temperature characteristic of this voltage VD12K has the characteristic shown in the formula (3), and thus, the output voltage Vout becomes as follows.

[Formula 5]

$$\frac{d}{dT}V_{out} \cong +4\left(1+\frac{R_{14}}{R_{13}}\right) mV/°C. \quad (5)$$

That is, the temperature detection circuit having a desired positive inclination decided by the resistors R23 and R24 can be realized.

However, a temperature detection circuit 210 disclosed in the publication has a problem that the output voltage is unable to obtain an accuracy of the voltage output in the vicinity of 0 V. This is because, when the current source I11 is configured by the transistor, the input voltage is not allowed to operate as a constant current source in the vicinity of the input voltage 0 V. Further, since the temperature characteristic corresponding to two pieces of the diode is obtained by being amplified by the operational amplifier A31, if the temperature characteristic of the diode has an inherent error component, there arises a problem also that the error component is amplified by an amplification factor decided by the operational amplifier A31 and the resistors R23 and R24.

SUMMARY OF THE INVENTION

The temperature detection circuit according to the present invention comprises one or more diodes connected in series, a constant current source connected to the one or more diodes, a comparison voltage generated by the one or more diodes, and an output unit for outputting the voltage or current corresponding to a voltage difference with the reference voltage.

The temperature detection circuit according to the present invention comprises:
one or more diodes connected in series; a constant current source connected to the one or more diodes;
a first resistor applied with a reference voltage at one end;
a first operational amplifier in which an inverting input terminal is connected to the other end of the first resistor, and a non-inverting input terminal is inputted with a comparison voltage generated by the one or more diodes;
a voltage current converting circuit connected to the first operational amplifier and converting a voltage subtracting the comparison voltage from the reference voltage into a current;
a first current mirror circuit in which an input terminal is connected with the voltage current converting circuit and a common terminal is inputted with a power supply voltage; and
a second resistor in which one end is connected between the first current mirror circuit and an output terminal and the other end is grounded.

In the present invention, the comparison voltage generated by one or more diodes and the voltage or the current based on the voltage difference with the reference voltage are outputted, so that the voltage according to the detection temperature can be accurately outputted from the vicinity of 0 V, thereby allowing the error component of the temperature characteristic of the diode to be removed.

The semiconductor device according to the present invention includes a plurality of chips mounted with a temperature detection circuit, the temperature detection circuit having each output terminal commonly connected, and comprises:
one or more diodes connected in series;
a constant power supply source connected to one or more diodes;
a voltage current converter for outputting a current according to the detection temperature based on a voltage difference between a comparison voltage generated by one or more diodes and a reference voltage comprising the same voltage as the comparison voltage in the predetermined temperature; and
a resistor in which one end is connected between the voltage current converter and the output terminal and the other end is grounded.

In the present invention, the output terminal of the temperature detection circuit mounted on each of the plurality of chips is commonly connected, so that the semiconductor device for outputting the voltage corresponding to an average temperature of each chip can be obtained.

The semiconductor device according to the present invention comprises a plurality of chips mounted with a temperature detection circuit; and a maximum value/minimum value detection circuit connected to a plurality of the temperature detection circuits, and the temperature detection circuit comprises: one or more temperature detection diodes connected in series; a constant current source connected to one or more temperature detection diodes; and an output unit for outputting a voltage according to the detection temperature based on a voltage difference between a comparison voltage generated by one or more temperature detection diodes and a reference voltage comprising the same voltage as the comparison voltage in the predetermined temperature, wherein the maximum value/minimum value detection circuit outputs the minimum value or the maximum value from among the output voltages of the plurality of temperature detection circuits.

In the present invention, each of the temperature detection circuit mounted on each of the plurality of chips is connected with a maximum value/minimum value detection circuit, so that the minimum value or the maximum value from among the detection voltages outputted by each temperature detection circuit can be outputted.

The temperature detection circuit according to the present invention comprises: a first circuit for outputting an output signal having a temperature dependency; a second circuit for outputting a constant output signal; and a third circuit for outputting a output signal according to the difference between the output signal of the first circuit and the output signal of the second circuit.

The temperature detection circuit according to the present invention comprises: a first circuit for outputting an output signal having a monotonic temperature dependency; a second circuit for outputting a constant output signal; and an operational amplifier for inputting an output signal of the first circuit to one end and an output signal of the second circuit to the other end through a resistor; wherein the operational amplifier outputs an output signal according to a difference in potential of the resistor.

According to the present invention, the temperature detection circuit and the semiconductor device capable of detecting an accurate temperature can be provided.

BRIEF DESCRIPTION OF THE DRAWINGS

The above and other objects, advantages and features of the present invention will be more apparent from the following description of certain preferred embodiments taken in conjunction with the accompanying drawings, in which:

FIGS. 7(a) and 7(b) are circuit diagrams showing an operational amplifier having an offset cancellation function in the second embodiment of the present invention, and are views showing different states of ON/OFF of the switches, respectively;

FIGS. 8(a) to 8(c) are views for explaining an ideal output voltage with an offset voltage taken as zero;

DETAILED DESCRIPTION OF THE PREFERRED EMBODIMENTS

An embodiment according to the present invention has a temperature detection circuit for detecting the temperature of a semiconductor chip, and outputs the voltage or the current proportional to the chip temperature. In the present embodiment, as an element for creating a temperature coefficient, a diode is used, and to obtain a desired temperature coefficient, a plurality of diodes are connected in series. Further, to reduce to zero the output current or the output voltage at certain temperatures, a voltage amplifying the voltage of a band gap reference (BGR) circuit for negating the voltage generated by the diode is used.

Here, a subtraction process for converting from the characteristic of the diode having a negative temperature coefficient to the output voltage having a positive temperature coefficient and an addition process of the voltage of BGR circuit for zero clearing the output current or the output voltage are performed by an adder. The voltage obtained by the addition process is converted into the current by the voltage current converter. This current becomes a current having a positive temperature characteristic. This current is again converted into the voltage by the resistor. At this time, the conversion factor of the voltage current converting circuit and the value of the resistor for converting the current into the voltage are appropriately designed, so that the desired characteristic can be obtained. Further, as to be described later, an offset cancellation circuit is mounted on the adder and the voltage current converter and a low pass filter is inserted into the final output so as to remove a noise component of the offset cancellation, thereby a more highly precision temperature detection circuit can be realized.

First Embodiment

Figure 1:
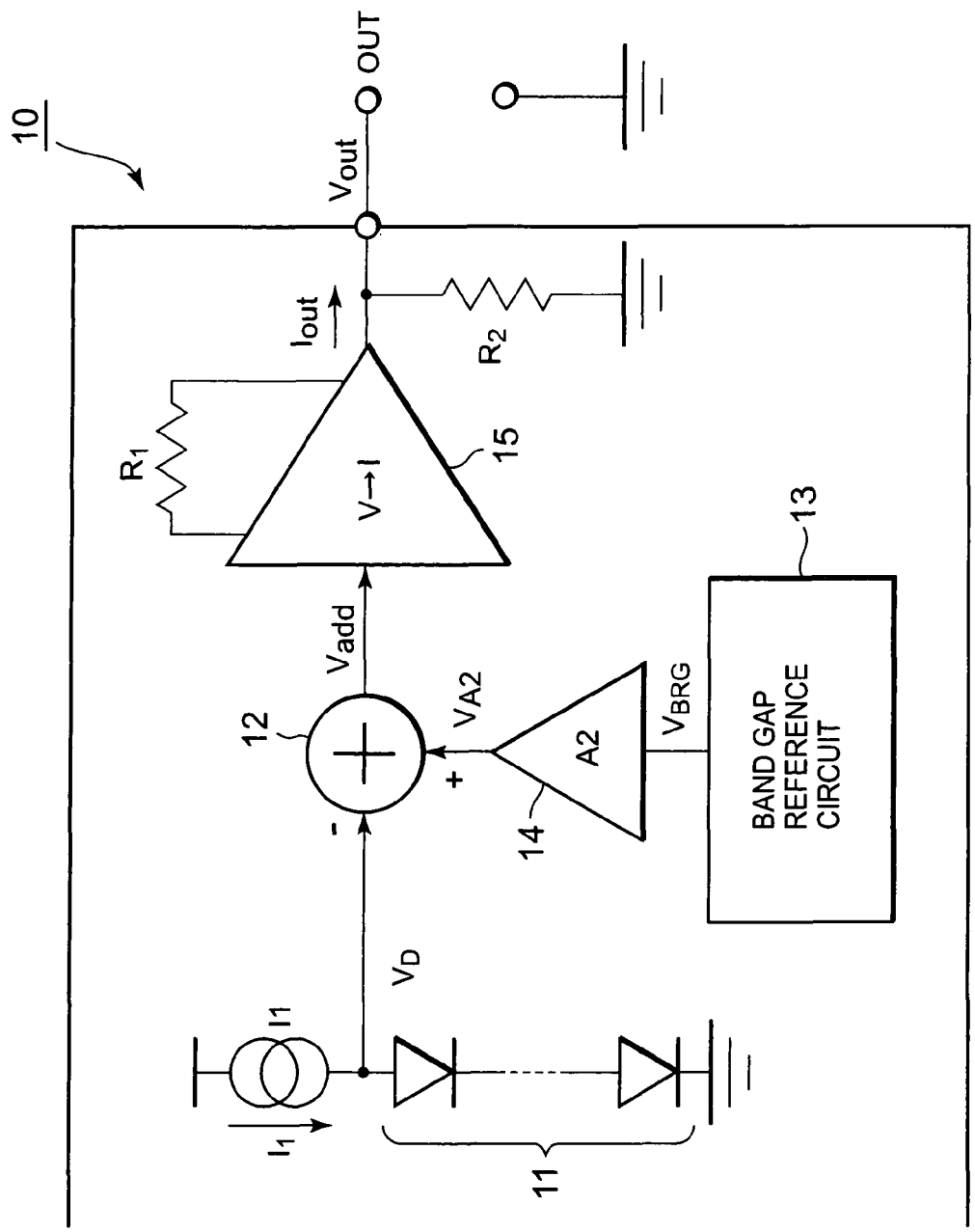
FIG. 1 is a block diagram showing a temperature detection circuit according to a first embodiment of the present invention.

FIG. 1 is a block diagram showing a temperature detection circuit according to the first embodiment of the present invention. As shown in FIG. 1, a temperature detection circuit 10 comprises a group of diodes 11 consisting of one or more diodes connected in series, a constant current source I1 connected to the group of diodes 11, and an output unit for outputting the voltage or the current according to the detection temperature based on the voltage difference between a comparison voltage and a reference voltage generated by the group of diodes 11.

The output unit according to the present embodiment is configured by an adder 12, a voltage current converter 15, and a resistor R2 as a second resistor, and outputs a voltage VOUT according to the detection temperature. The temperature detection circuit 10 further comprises a BGR circuit 13 for generating a band gap reference voltage (BGR voltage) and an amplifier 14 for amplifying the BGR voltage, and inputs the voltage having amplified the BGR voltage into the adder 12 as the reference voltage.

The adder 12 performs a minus addition on the series voltage (comparison voltage) VD generated by the group of diodes 11 biased by the constant current source I1, and performs a plus addition on a reference voltage VA2 having amplified a BGR voltage VBGR of a BGR circuit 13. A voltage current converter 15 converts the output voltage of the adder 12 into an output current IOUT by a voltage current converter 15. This voltage current converter 15 includes a resistor R1, and by this resistor R1, a conversion coefficient when converting the output voltage of the adder 12 into the current is decided.

The second resistor R2 is connected between the output of the voltage current converter 15 and a reference potential GND, and functions as the current voltage converter for converting the output current IOUT of the voltage current converter 15 into the output voltage VOUT. The common connecting point of the output and the resistor R2 of the voltage current converter 15 is an output terminal OUT, and outputs the voltage VOUT according to the detection temperature.

The group of diodes 11 and the constant current source I1 configures a first circuit for outputting an output signal having a monotonic temperature dependency. The BGR circuit 13 and the amplifier 14 configures a second circuit for outputting a constant output signal. Further, the output unit functions as a third circuit for outputting the output signal according to a difference between the output signal of the first circuit and the output signal of the second circuit. Incidentally, the "monotone" referred to here means that, if the relationship between temperature (x) and an output signal (f(x)) is x1<2, then, it becomes a monotonic function of f(x1)<f(x2). The relationship of each temperature and each output signal of the first circuit and the second circuit is the monotonic function, and at the same time, the output signal of the third circuit is configured to have the characteristic to become a monotonic function for the temperatures of the first and the second circuits.

Next, the operation of the temperature detection circuit according to the present embodiment will be described. In the temperature detection circuit 10, the output voltage VBGR of the BGR circuit 13 is amplified by the amplifier 14 so that the output current IOUT at certain temperatures (T=T1) becomes zero. That is, when the comparison voltage generated by the group of diodes 11 connected n pieces in series at certain temperatures T1 is taken as VD (T1) and the bias current of the group of the diodes 11 is taken as I1, the comparison voltage VD (T1) can be represented as follows.

[Formula 6]

$$V_{D(T1)} = n \frac{k(273+T_1)}{q} \ln \frac{I_1}{I_{S(T1)}} \quad (6)$$

Here is shown a reversed saturation current for the diode, where k: Boltzman's constant, q: charge of electron, and IS(T1): temperature T1.

When the BGR voltage is taken as VBGR, and the voltage amplification factor of the amplifier 14 is taken as A2, the output voltage (reference voltage) VA2 of the amplifier 14 becomes as follows.

[Formula 7]

$$V_{A2}=A_2 V_{BGR} \quad (7)$$

Here, to add the output voltage VA2 of the amplifier 14 by the adder 12 and subtract the voltage (comparison voltage) VD of the group of diodes 11, an output voltage Aadd of the adder 12 becomes as follows.

[Formula 8]

$$V_{add}=A_2 V_{BGR}-V_{D(T1)} \quad (8)$$

The output current Iout converting the output voltage Aadd of this adder 12 into the current by the conversion factor of a resistor value R1 in the voltage current converter 15 becomes as follows.

[Formula 9]

$$I_{out} = \frac{A_2 V_{BGR} - V_{D(T1)}}{R_1} \quad (9)$$

The output voltage Vout is converted into a voltage by the resistor R2 by Iout and becomes as follows.

[Formula 10]

$$V_{out} = I_{out} R_2 = \frac{R_2}{R_1}(A_2 V_{BGR} - V_{D(T1)}) \quad (10)$$

Here, assuming that A2VBGR=VD(T1), the output voltage VOUT becomes zero at the time of the temperature T1. The temperature coefficient of this output voltage VOUT becomes −2n (mV/° C.) if n pieces of diode are connected in series because the temperature coefficient corresponding to one piece of the diode is approximately −2n(mV/° C.). Consequently, the temperature coefficient of the output voltage Vout becomes as follows.

[Formula 11]

$$\frac{d}{dT} V_{out} \cong +2n \frac{R_2}{R_1} (\text{mV/°C.}) \quad (11)$$

That is, the temperature coefficient can be decided by a ratio of the resistors R1 and the R2 to the number of n pieces of the diode configuring the group of diodes 11.

Figure 2:
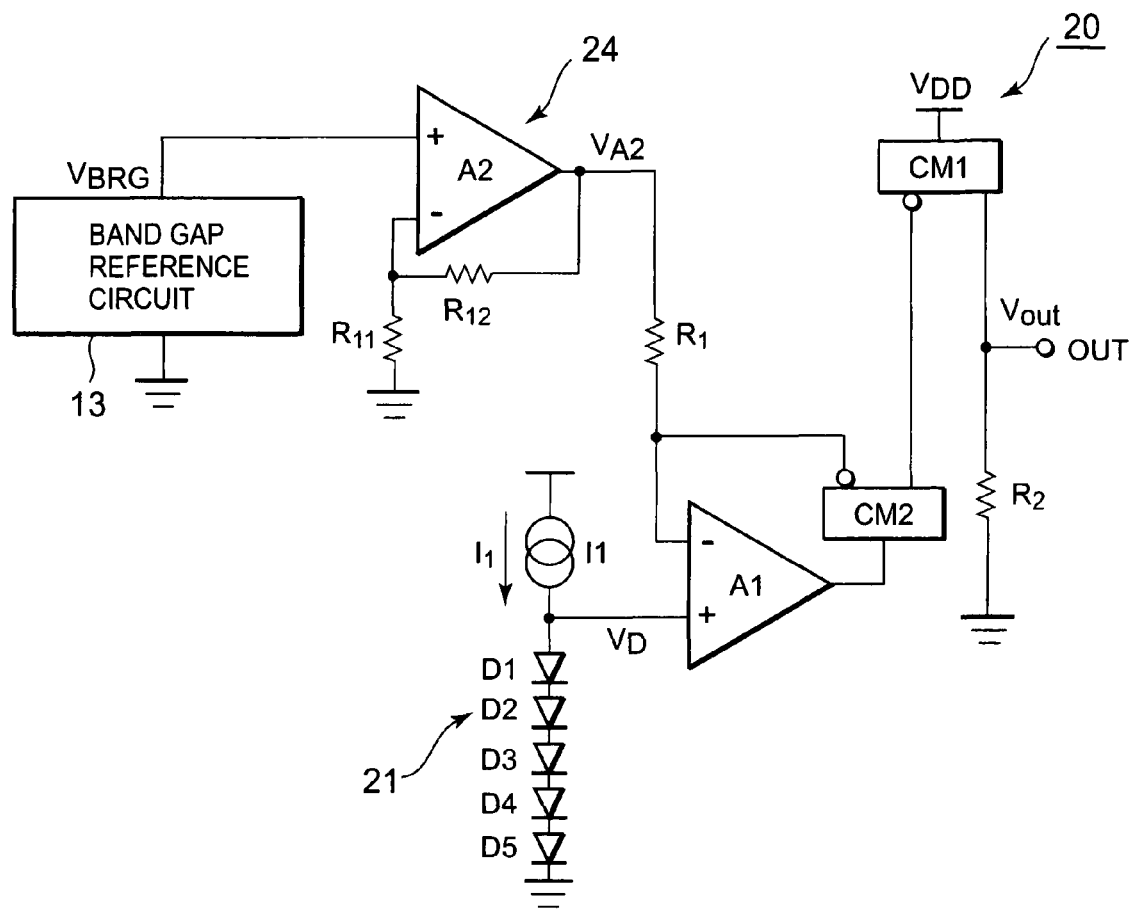
FIG. 2 is a circuit diagram showing a specific example of the temperature detection circuit according to the first embodiment of the present invention.

Next, a specific example according to the present embodiment will be described. FIG. 2 is a circuit diagram showing the specific example of the temperature detection circuit shown in FIG. 1. Incidentally, in this specific example, the same component parts as the temperature detection circuit shown in FIG. 1 will be attached with the same reference numerals and the detailed description thereof will be omitted.

A temperature detection circuit 20 according to the present specific example comprises a group of diodes 21 consisting of five diodes D1 to D5 connected in series and the constant current source I1 connected to the group of diodes 21. Further, the temperature detection circuit 20 comprises an amplifier 24 for amplifying the BGR circuit 13 generating the BGR voltage VBGR and the BGR voltage. The amplifier 24 comprises the operational amplifier A2 and resistors R11 and R12 deciding a closed loop gain of the operational amplifier A2. The operational amplifier A2 is connected with the output of the BGR circuit 13 in the forward rotation input terminal. The resistor R11 is connected between the inverting input terminal of the operational amplifier A2 and the ground, and the resistor R12 is connected between the inverting input terminal and the output terminal of the operational amplifier A2.

Further, the temperature detection circuit 20 comprises first and second resistors R1 and R2, a first operational amplifier A1, and current mirror circuits CM1 and CM2. The resistor R1 has one end connected with an output terminal of the operational amplifier A2 and the other end connected with the inverting input terminal of the first operational amplifier A1. The first operational amplifier A1 has its forward rotation input terminal connected with the maximum potential side of the group of diodes 21, and its inverting input terminal connected with the input terminal of the second current mirror circuit CM2, and its output terminal connected with the common terminal of the second current mirror circuit CM2. The output terminal of the current mirror circuit CM2 is connected to the input terminal of the current mirror circuit CM1. The voltage current converter is configured by the resistor R1, the operational amplifier A1, and the current mirror circuit CM2, and by the resistor R1, the conversion factor of the voltage current conversion is decided. Further, the first current mirror circuit CM1 has its input terminal connected with the output terminal of the current mirror circuit CM2 at, and has its common terminal inputted with the power supply voltage, thereby inverting the output current of the second current mirror circuit CM2. The output terminal of the first current mirror circuit CM1 is connected to one end of the resistor R2, and becomes the output terminal OUT.

The other end of the resistor R2 is connected to the GND. The resistor R2 functions as the current voltage converter for converting the output current of the first current mirror circuit CM1 into the voltage.

Next, the operation of the temperature detection circuit according to the present embodiment will be described. When the output voltage of the BGR circuit 13 of the temperature detection circuit 20 is taken as VBGR, the voltage VA2 of the output terminal of the second operational amplifier A2 becomes as follows.

[Formula 12]

$$V_{A2} = V_{BGR}\left(1 + \frac{R_{12}}{R_{11}}\right) \quad (12)$$

Further, the voltage (comparison voltage) VD(T1) generated by the group of diodes 21 at the time of certain temperatures T1 becomes as follows when the bias current of the group of diodes 21, that is, the current of the current source I1 is taken as I1.

[Formula 13]

$$V_{D(T1)} = 5\frac{k(273 + T_1)}{q}\ln\frac{I_1}{I_{S(T1)}} \quad (13)$$

Here is shown a reversed saturation current for the diode, where k: Boltzman's constant, q: charge of electron, and IS(T1): temperature T1.

That is, the non-inverting input voltage of the first operational amplifier A1 becomes the value as shown in the formula (13). On the other hand, since the inverting input voltage of the operational amplifier A1 is in an imaginary short relationship with the non inverting input terminal, it becomes also the value shown in the above formula (13). Consequently, a double end voltage VR1 of the resistor R1 becomes as follows.

[Formula 14]

$$V_{R1} = V_{A2} - V_{D(T1)} \quad (14)$$
$$= V_{BGR}\left(1 + \frac{R_{12}}{R_{11}}\right) - 5\frac{k(273 + T_1)}{q}\ln\frac{I_1}{I_{S(T1)}}$$

Further, the current IR1 flowing into the resistor R1 becomes as follows.

[Formula 15]

$$I_{R1} = \frac{V_{A2} - V_{D(T1)}}{R_1} \quad (15)$$
$$= V_{BGR}\left(1 + \frac{R_{12}}{R_{11}}\right) - 5\frac{k(273 + T_1)}{q}\ln\frac{I_1}{I_{S(T1)}} \Big/ R_1$$

The current of this formula (15) all becomes the input current of the second current mirror circuit CM2. This is caused by a stagnant current at the input terminal of the first operational amplifier A1. That is, the current shown in the above formula (15) becomes an output current of the second current mirror circuit CM2 as it is, and further becomes the input current of the first current mirror circuit CM1. Consequently, the output current of the first current mirror circuit CM1 becomes also the current value shown by the formula (15). This current is converted into the voltage by the resistor R2, and becomes the final output voltage VOUT as shown below.

[Formula 16]

$$V_{out} = \frac{R_2}{R_1}(V_{A2} - V_{D(T1)}) \quad (16)$$
$$= \frac{R_2}{R_1}\left\{V_{BGR}\left(1 + \frac{R_{12}}{R_{11}}\right) - 5\frac{k(273 + T_1)}{q}\ln\frac{I_1}{I_{S(T1)}}\right\}$$

Here, assuming that VBGR=VD(T1), at the time of temperature T1, the output voltage Vout becomes zero. The temperature coefficient of this output voltage VOUT becomes approximately −10 (mV/° C.) if five pieces of the diode are connected in series because the temperature coefficient corresponding to one piece of the diode is approximately −2 (mV/° C.). Consequently, the temperature coefficient of the output voltage Vout becomes as follows.

[Formula 17]

$$\frac{d}{dT}V_{out} \cong +10\frac{R_2}{R_1}(\text{mV}/°\text{C.}) \quad (17)$$

Figure 3:
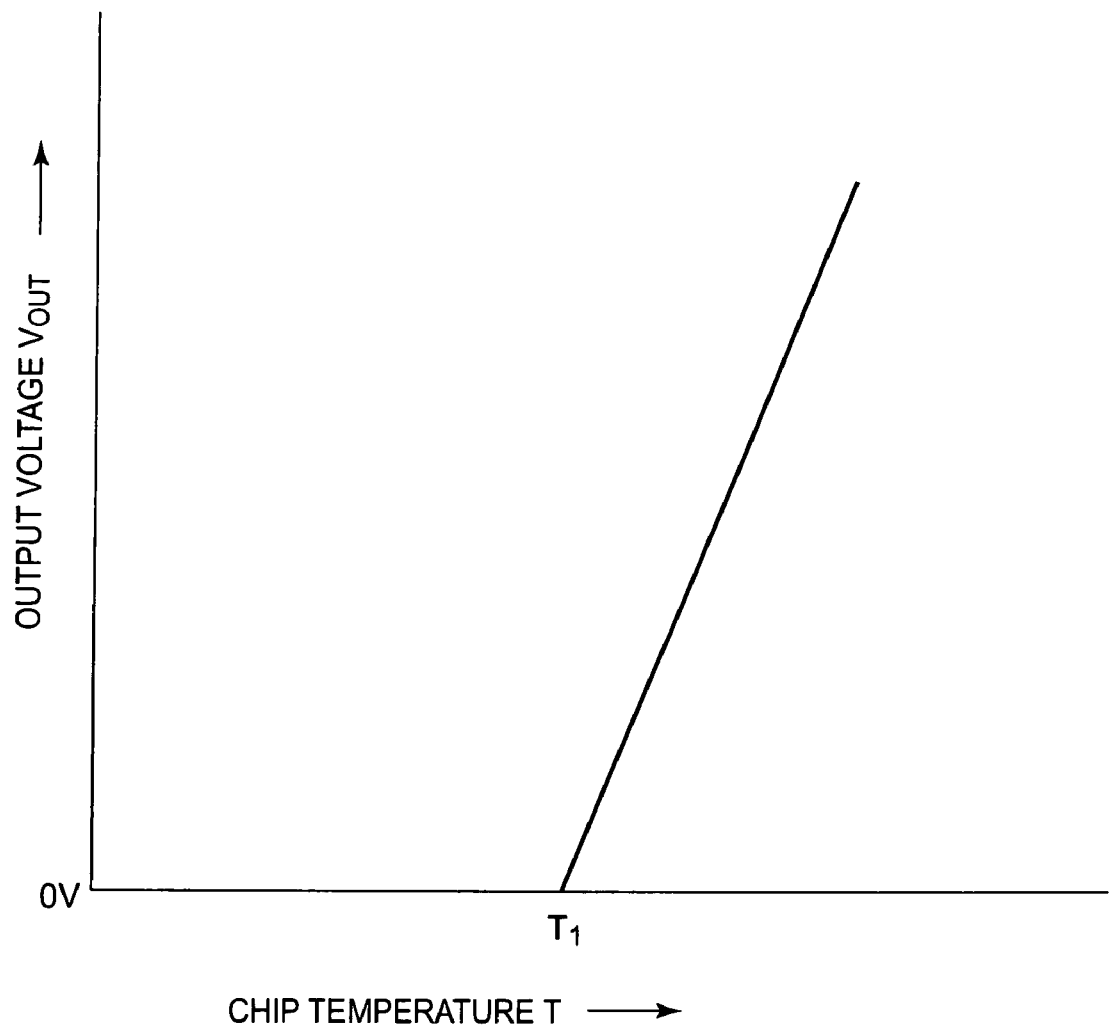
FIG. 3 is a view showing a relationship between a chip temperature and an output voltage of the present invention.
Figure 4:
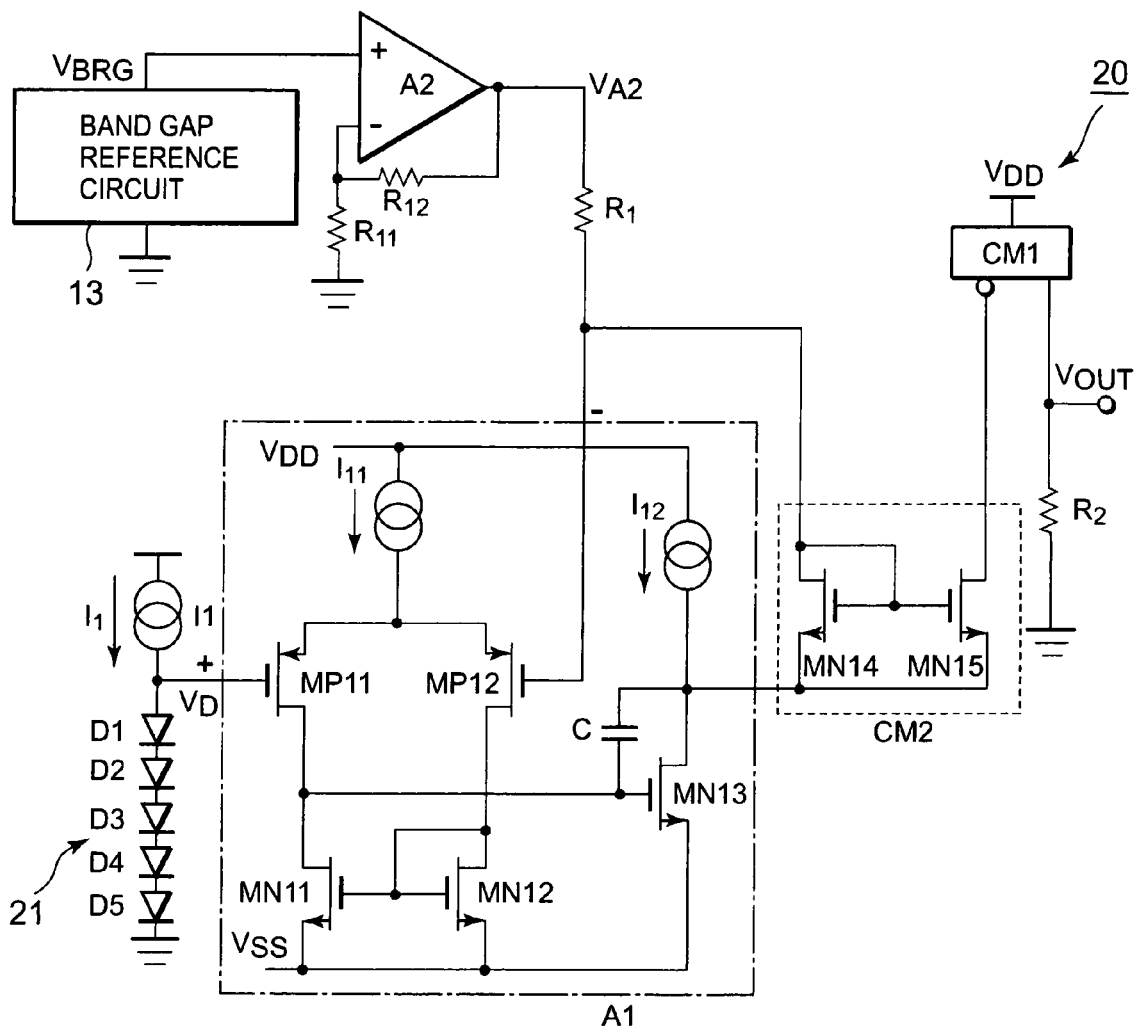
FIG. 4 is a circuit diagram showing another specific example of the temperature detection circuit according the first embodiment of the present invention.

That is, similarly to the formula (11), in the temperature detection circuit 20 also, the temperature coefficient can be decided by a ratio of the resistor R1 and the Resistor R2. Thus, the description has been made based on the case of VD(T1)<VA2. Further, when it is VD(T1)>VA2, the second current mirror circuit CM2 does not operate, and consequently, the current does not flow into the resistor R1. Hence, the inverting input terminal of the first operation amplifier A1 is applied with VA2 of the potential lower than VD(T1) as it is, and by a differential voltage with VD, the output terminal of the first operational amplifier A1 is fixed high, and the inoperable state of the second current mirror CM2 is maintained. That is, up to certain temperatures (T1), VOUT is fixed to 0 V, and over and above certain temperatures (T1), according to the formula (10), the output voltage VOUT is outputted (FIG. 3). As a result, in the present embodiment, the characteristic in the vicinity of 0 V unrealizable by the technique can be realized with high accuracy. Needless to mention in this case, it may be VD (T1=25° C.)=VA2. Further, as one example of the present embodiment, specific circuit examples of the first operational amplifier A1 and the second current mirror circuit CM2 will be shown in FIG. 4 for reference.

Figure 5:
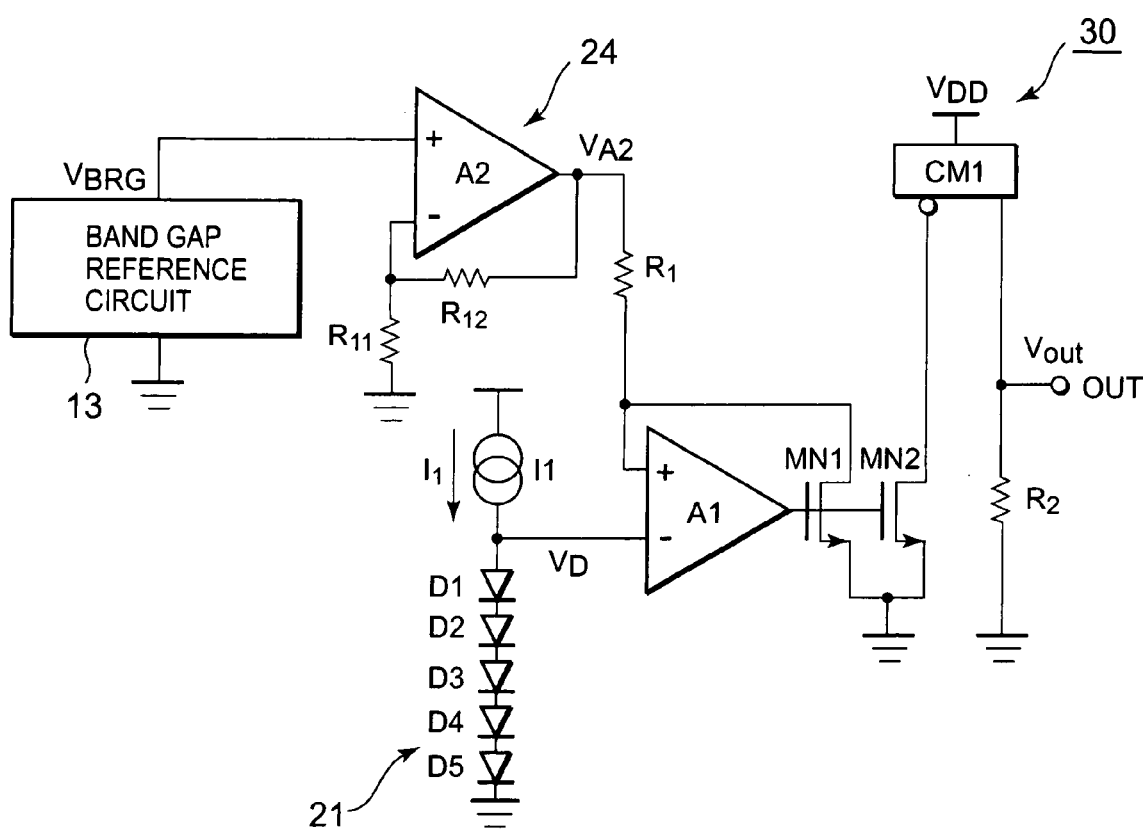
FIG. 5 is a circuit diagram sowing the temperature detection circuit according to a modified example of the first embodiment of the present invention.

Next, a modified example in the present embodiment will be described. FIG. 5 is a circuit diagram showing the temperature detection circuit according to the modified example of the present embodiment. The temperature detection circuit 30 according to the present modified example has realized the voltage current conversion circuit by two MOS transistors in place of the second current mirror circuit CM2 in the temperature detection circuit 20 shown in FIG. 2. Incidentally, in the present embodiment, the same component parts as the temperature detection circuit shown in FIG. 2 are attached with the same reference numerals, and the description thereof will be omitted.

As shown in FIG. 5, in place of the second current mirror circuit CM2, first and second N channel MOS transistors MN1 and MN2, whose respective sources and gates are commonly connected, are inserted. The commonly connected gates are connected to the output terminal of the first operational amplifier A1, and the commonly connected sources are connected to the ground GND. Further, the drain of the first N channel MOS transistor is commonly connected to the non-inverting input terminal of the first operational amplifier A1 and one end of a resistor R13. Further, the drain of the second N channel MOS transistor MN2 is connected to the input terminal of the first current mirror circuit CM1. Other connections are the same as the temperature detection circuit 20 shown in FIG. 2.

Next, the operation of the present modified example will be described. The gate and the drain of the first N channel MOS transistor MN1 are in an opposite phase relationship. Hence, the polarity of the input terminal which implements a feed back is in reverse to that of FIG. 2. That is, the feed back is implemented toward the non-inverting input terminal from the drain of the N channel MOS transistor MN1, whose gate is connected to the output of the operational amplifier A1. The non-inverting input terminal is inputted with the comparison voltage VD as an input voltage. The formula for converting the voltage into the voltage by this operational amplifier A1 is quite the same as described above. Here, the N channel MOS transistors MN1 and MN2 have each gate and each sources commonly connected, and this makes each drain current the same. Consequently, the same current as the current converted from the voltage by the operational amplifier A1 and the N channel MOS transistor MN1 is let flow into the N channel MOS transistor MN2. The operation other than as described above is the same as the temperature detection circuit 20 shown in FIG. 2.

In the present embodiment, the temperature detection circuits 10 and 20 make use of the temperature characteristics of the plurality of diodes connected in series, and set the output voltage to 0 V at certain temperatures T1. By using the BGR circuit 13 guaranteed for a constant value having no temperature dependency, the comparison voltage generated by the diodes is configured so as to be negated, so that accurate temperature detection can be performed. Incidentally, the constant value in the present embodiment means a value allowing manufacturing variations such as diffusion variations and taking the value outputted in the ordinary BGR circuit as a constant value. That is, even when the output voltage is in the vicinity of 0 V, accurate temperature detection can be performed, and, moreover, even when there is an error component in the temperature characteristics of the groups of diodes 11 or 21, such component can be removed. Further, as shown in FIGS. 2 and 5, each input voltage of the operational amplifiers A1 and A2 is inputted with a voltage higher than the threshold voltage of the transistor and yet a voltage sufficiently lower than a positive power supply VDD, and thus, there is no need for the configuration of a Rail to Rail circuit and a circuit design can be made easy.

Second Embodiment

Figure 6:
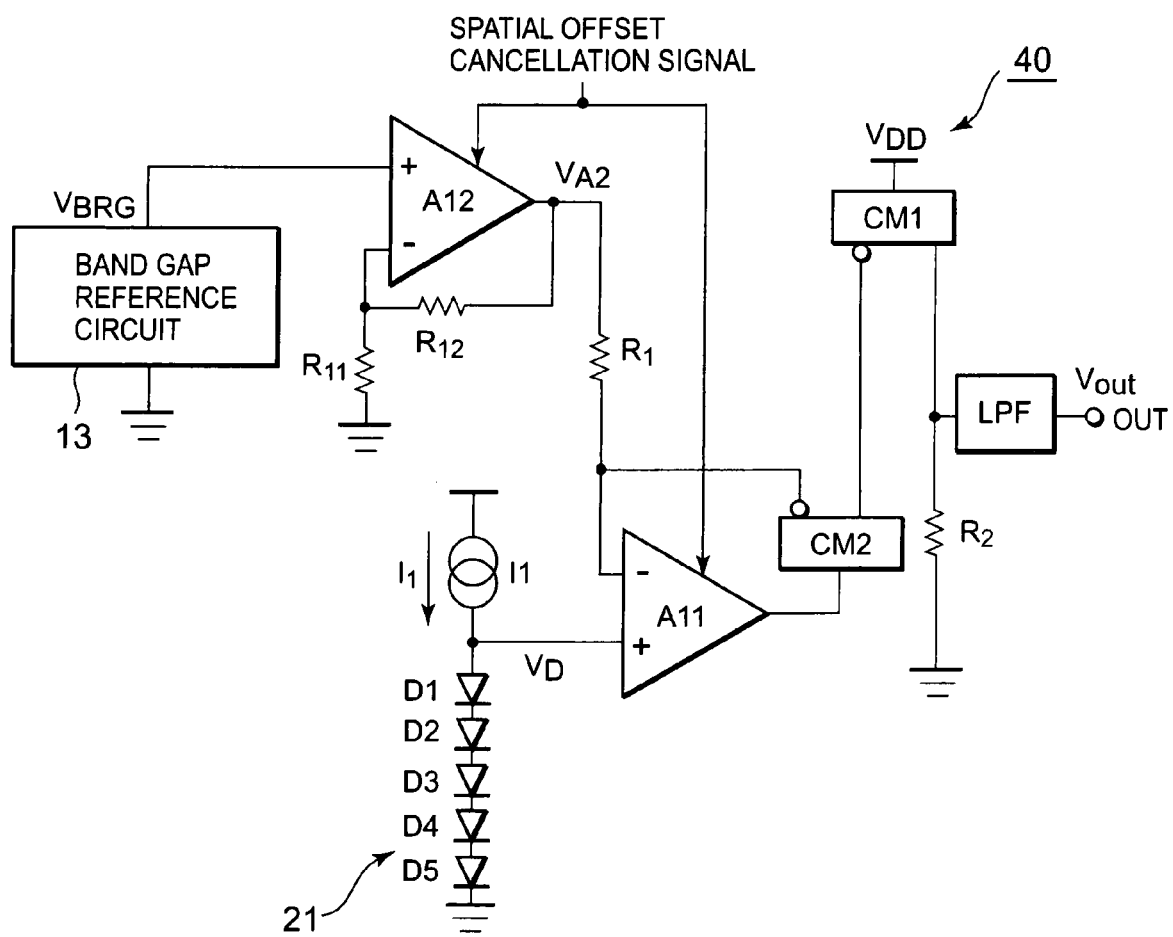
FIG. 6 is a view showing the temperature detection circuit according to a second embodiment of the present invention.
Figure 9D:
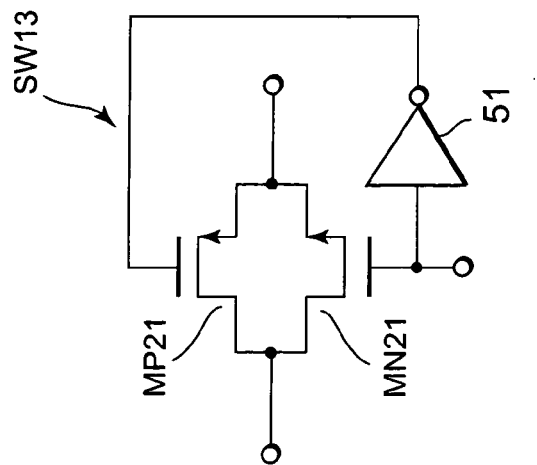
FIGS. 9(b) to 9(d) are views showing specific configurations of the switches.
Figure 9C:
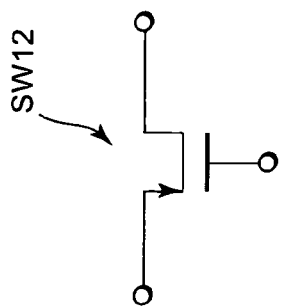
Figure 9B:
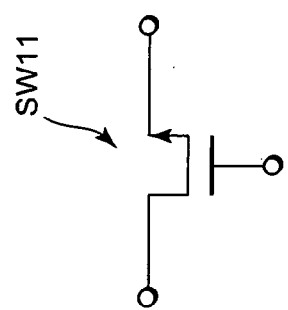
Figure 9A:
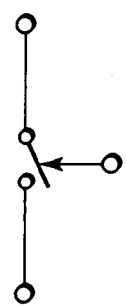
FIG. 9(a) is a view showing the switch.

Next, a second embodiment of the present invention will be described. A temperature detection circuit according to the present invention is such that, when offset voltages of the first and second operational amplifiers A1 and A2 cause a problem, for example, for the temperature detection circuit 20 shown in FIG. 2, measures are taken to meet the problem. FIG. 6 is a view showing a temperature detection circuit according to the present embodiment. Incidentally, in the temperature detection circuit according to the present embodiment shown in FIG. 6, the same component parts as the temperature detection circuit shown in FIG. 2 are attached with the same reference numerals, and the detailed description thereof will be omitted.

As shown in FIG. 6, a temperature detection circuit 40 according to the present embodiment takes the first and second operational amplifiers A1 and A2 shown in FIG. 2 as operational amplifiers A11 and A12 attached with an offset cancellation circuit, and controls the control signals thereof by a spatial offset cancellation signal S of a duty 50%. Further, the preceding stage of an output terminal OUT is inserted with a low pass filter LPF.

Here, a specific circuit configuration to realize the offset cancellation by the operational amplifier is shown in FIGS. 7(a) and 7(b). In the following description, a [make type switch] is referred to as a type closing (turning ON) a switch when the control signal is inputted, and a [brake type switch] is referred to as a type opening (turning OFF) a switch when the control signal is inputted.

The operational amplifiers A11 and A12 are similarly configured. That is, the operational amplifiers A11 and A12, as shown in FIG. 7(a) comprise two pieces of P channel MOS transistors MP11 and MP12 (first and second transistors) configuring a differential pair of operational circuit attached with offset cancellation. Further, the operational amplifiers A11 and A12 comprise a constant current source I11 biasing this differential pair. The constant current source I11 is connected between the commonly connected source of the P channel MOS transistor MP11 and the MP12 and the positive power supply VDD. Further, the differential pair is connected with N channel MOS transistor MN11 and MN12 in the current mirror configuration serving as an active load and a differential to single conversion. Further, the differential pair comprises a N channel MOS transistor MN13 (output transistor) configuring the amplifier circuit of a second stage and a constant current source I12 working as the active load of this N channel MOS transistor MN13. The constant current source I12 is connected between the positive power supply VDD and the drain of the N channel MOS transistor MN13. Further, between the gate and the drain of the N channel MOS transistor M13, a phase compensating capacitor C is connected.

The drain of one P channel MOS transistor MP11 configuring the differential pair is connected to the drain of the N channel MOS transistor MN11, and the drain of the other P channel MOS transistor MP12 configuring the differential pair is connected to the drain of the N channel MOS transistor MN12.

Further, the operational amplifiers A11 and A12 comprises switches SW1, SW4, SW6, and SW8 of the brake type and switches SW2, SW3, SW5, and SW7 of the make type. A group of these switches SW1 to SW8 is all interlocked and controlled, and when the switches SW1, SW4, SW6, and SW8 of the brake type are turned ON, the switches SW2, SW3, SW5, and SW7 of the make type are turned OFF (see FIG. 7(a)), and when the switches SW1, SW4, SW6, and SW8 of the brake type are turned OFF, the switches SW2, SW3, SW5, and SW7 of the make type are turned ON (see FIG. 7(a)).

Here, the switch SW1 of the brake type is connected between the gate and the drain of the N channel MOS transistor MN11, and the switch SW2 of the make type is connected between the gate and the drain of the N channel MOS transistor MN12, and the switch SW3 of the make type is connected between the drain of the N channel MOS type transistor MN11 and the gate of the N channel MOS transistor MN13, and the switch SW4 of the brake type is connected between the drain of the N channel MOS transistor MN12 and the gate of the N channel MOS transistor MN13. Further, switch SW5 of the make type is connected between the gate of the P channel MOS transistor MP12 and the inverting input terminal Vin−, and the switch SW6 of the brake type is connected between the gate of the P channel MOS transistor MP11 and the inverting input terminal Vin−, and the switch SW7 of the make type is connected between the gate of the P channel MOS transistor MP1 and the non-inverting input terminal Vin+, and the switch SW8 of the brake type is connected between the gate of the P channel MOS transistor MP12 and the input terminal Vin+.

A first mode in which the input Vin− is inputted to the P channel MOS transistor NP11, and the input Vin+ is inputted to the P channel transistor NP12 by turning ON and OFF these switches, and the N channel MOS transistor MN13 serving as an output transistor is controlled based on the output of the P channel transistor NP12 can be switched over to a second mode in which the input Vin− is inputted to the P channel MOS transistor NP12 and the input Vin+ is inputted to the P channel transistor NP11, and based on the output of the P channel transistor NP 11, the N channel MOS transistor MN13 is controlled.

Next, the operation of this operational amplifier attached with offset cancellation circuit will be described. The operational amplifiers attached with offset cancellation circuit A11 and A12 configure a differential pair by the P channel MOS transistors MP11 and MP12, and comprise the N channel MOS transistors MN1 and MN2 of the current mirror configuration serving as a function of differential to single ended conversion as its active load. Here, when the switch SW1 is closed, the drain of the N channel MOS transistor MN12 becomes its single ended output, and when the switch SW2 is closed, the drain of the N channel MOS transistor MN11 becomes its single ended output.

In this way, the output terminal changes according to the ON/OFF state of the switches SW1 and SW2, and consequently, the switches SW3 and SW4 are provided for the selection of output. The signal from single conversion is inputted to the gate of the MN13 serving as the output transistor in the N channel MOS transistor through the switches SW3 and SW4. At this time, the constant current source I12 operates as the active load of the N channel MOS transistor MN13. The drain of the N channel MOS transistor MN13 becomes the output terminal OUT. The capacitor C performs an operation of phase compensation as a mirror capacitor.

When the switches SW1 to SW4 are switched over, the inverting input becomes the gate of the P channel MOS transistor MP11 or the gate of the P channel MOS transistor MP. Consequently, to help this switching, the switches SW5 and SW6 are provided. That is, as shown in FIG. 7(*a*), when the switches SW1 and SW4 are closed, the inverting input becomes the gate terminal of the P channel MOS transistor MP11, and at this time, by closing the switch SW6, the inverting input terminal Vin− and the gate terminal of the P channel MOS transistor MP11 are connected. The forward rotation input becomes the gate terminal of the P channel MOS transistor MP12, and as a result, the switch SW8 is closed and is connected to the non-inverting input terminal Vin+.

On the other hand, as shown in FIG. 7(*b*), when the switches SW2 and SW3 are closed, the inverting input becomes the gate terminal of the P channel MOS transistor MP2, and at this time, by closing the switch SW5, the inverting input terminal Vin− and the gate terminal of the P channel MOS transistor MP12 are connected. The forward rotation input becomes the gate terminal of the P channel MOS transistor MP11, and as a result, the switch SW7 is closed and is connected to the non-inverting input terminal Vin+.

Next, when a so-called voltage follower connection is performed, in which the inverting input terminal Vin− and the output terminal Vout of this operational amplifier (amp) attached with offset cancellation circuit are commonly connected, an offset voltage of the operational amplifier circuit changed according to the state of each switch will be described. Main causes for generating the offset voltage as the operation amplifier circuit are citable from the threshold (VT) relative variations of a pair of differential transistors configured by the P channel MOS transistors MP11 and MP12 and the threshold (VT) relative variations of a pair of transistors of the current mirror circuit configured by the N channel MOS transistors MN11 and MN12 performing an operation of active load. In the switch state of the switch group SW1 to SW8, there are two states, and when each state is taken as A and B respectively, assuming that the switch state is A, if the offset voltage generated due to these threshold (VT) relative variations is taken as VOS, and the input voltage of the amp at that time is taken as VIN, and the output voltage is taken as VO, then, VO=VIN+VOS.

Next, when the switch is switched over and the state of the switch is taken as B, the offset voltage is outputted in a direction to the reverse polarity when the state of the switch is A, and as a result, the output voltage becomes VO=VIN−VOS. By switching over the switch in this way, it is found out that the output voltage VO is symmetrically outputted for an ideal output voltage value VIN. Consequently, if the two states of A and B are switched over by the switches having a period of duty 50% and its average value is taken, as a result, the offset voltage becomes zero, and the offset can be cancelled.

FIG. 8 is a view for explaining the ideal output voltage with the offset voltage taken as zero. When a group of the switches SW1 to SW8 are switched at certain periods, the waveform of the output terminal VOUT, as shown in FIG. 8(*a*), becomes a pulsed waveform having a symmetrical amplitude value for the ideal voltage according to the offset voltage. At this time, when the period of this switching frequency is set to the duty 50% and its average value is taken, it is appreciated that the portion equivalent to the offset voltage is averaged and becomes zero, thereby making it possible to obtain an approximate ideal value. In the present embodiment, a low pass filter LPF is used for this averaging out. As a circuit for realizing the low pass filter, for example, as shown in FIG. 8(*b*), the resistor R is inserted between the input and the output, and the capacitor C is inserted between the output side and the GND. If the time constant of this CR is sufficiently larger than 1/(switching frequency), and moreover, the duty is 50%, then, it is possible to remove a ripple component equivalent to the offset voltage and obtain the ideal output voltage as shown in FIG. 8(*c*).

Next, a specific example of the switch will be described. First, the make type switch will be described. As a specific configuration of the switch shown in FIG. 9(*a*), there are the switches SW11, SW12, and SW13 shown in FIGS. 9(*b*) to 9(*d*). That is, as shown in FIGS. 9(*b*) to 9(*c*), both ends thereof correspond to each of the drain/source of the N channel MOS transistor or the P channel MOS transistor. In this case, a control of the ON/OFF of the switch is performed by the gate. Here, in the case of the N channel MOS transistor, when the gate is at the high level, the switch SW11 is turned ON, and when the gate is at the low level, the switch SW11 is turned OFF. In the case of the P channel MOS transistor, conversely, when the gate is at the low level, the switch SW12 is turned ON, and when the gate is at the high level, the switch SW12 is turned OFF.

Further, as shown in FIG. 9(*d*), the switch can be configured by using the N channel and the P channel. That is, the switch SW13 is configured by the N channel MOS transistor MN21, the P channel MOS transistor MP21, and an inverter 51. In this case, each drain and source of the N channel MOS transistor MN21 and the P channel MOS transistor MP21 are commonly connected, and each gate is connected through the inverter 51. As a result, each gate is inputted with a reversed phase signal, and is driven.

The switch SW13 configured in this way operates such that when the gate of the N channel MOS transistor MN21 is at the high level, the gate of the P channel MOS transistor NP 21 is set to the low level by the inverter, so that both of the gates are turned ON. That is, the switch is turned ON. On the other hand, when the gate of the N channel MOS transistor MN21 is at the low level and the gate of the P channel MOS transistor NP21 is set to the high level by the inverter, so that both of the gates are turned OFF. That is, the switch is turned OFF.

Here, the decision criteria as to whether the switch SW11 of the N channel MOS transistor is used as a switch or whether the switch SW12 of the P channel MOS transistor is used or whether the switch SW13 comprising the combined circuits of the N channel MOS transistor and the P channel MOS transistor is used depends on the potential applied to the switch. For example, assuming that the power supply voltage is taken as VDD, when the voltage applied to the switch is approximately higher than VDD/2, the P channel MOS transistor (SW11) is used, and on the contrary, when the voltage applied to the switch is approximately lower than VDD/2, the N channel MOS transistor (SW12) is used, and when the switch is required to operate in the entire voltage range from VSS (GND) to VDD, the switch W13 is used.

In the case of the brake type switch, it is in an antagonized relationship with the make type switch, and the logic of the gate voltage control only needs to be reversed. That is, this can be realized by adding an inverter corresponding to one stage on the gate control of the make type switch. That is, when the control voltage is at the low level, the switch is turned ON, and when at the high level, the switch is turned OFF.

In the present embodiment also, to set the output voltage to zero at the temperature T1, the comparison voltage generated by the group of diodes 11 or 21 is subtracted by the reference voltage amplifying the BGR voltage, whereby the correct temperature detection can be performed even when the output voltage is in the vicinity of V. Further, even when there is an error component in the temperature characteristics of the group of diodes 11 or 21, the error component can be removed. Further, by cancelling the offset by the offset cancellation function, the offset voltage carried by each of the operational amplifiers A31 and A32 is not amplified by the closed loop gain only decided by the input resistor and the feed back resistor.

Third Embodiment

Figure 10:
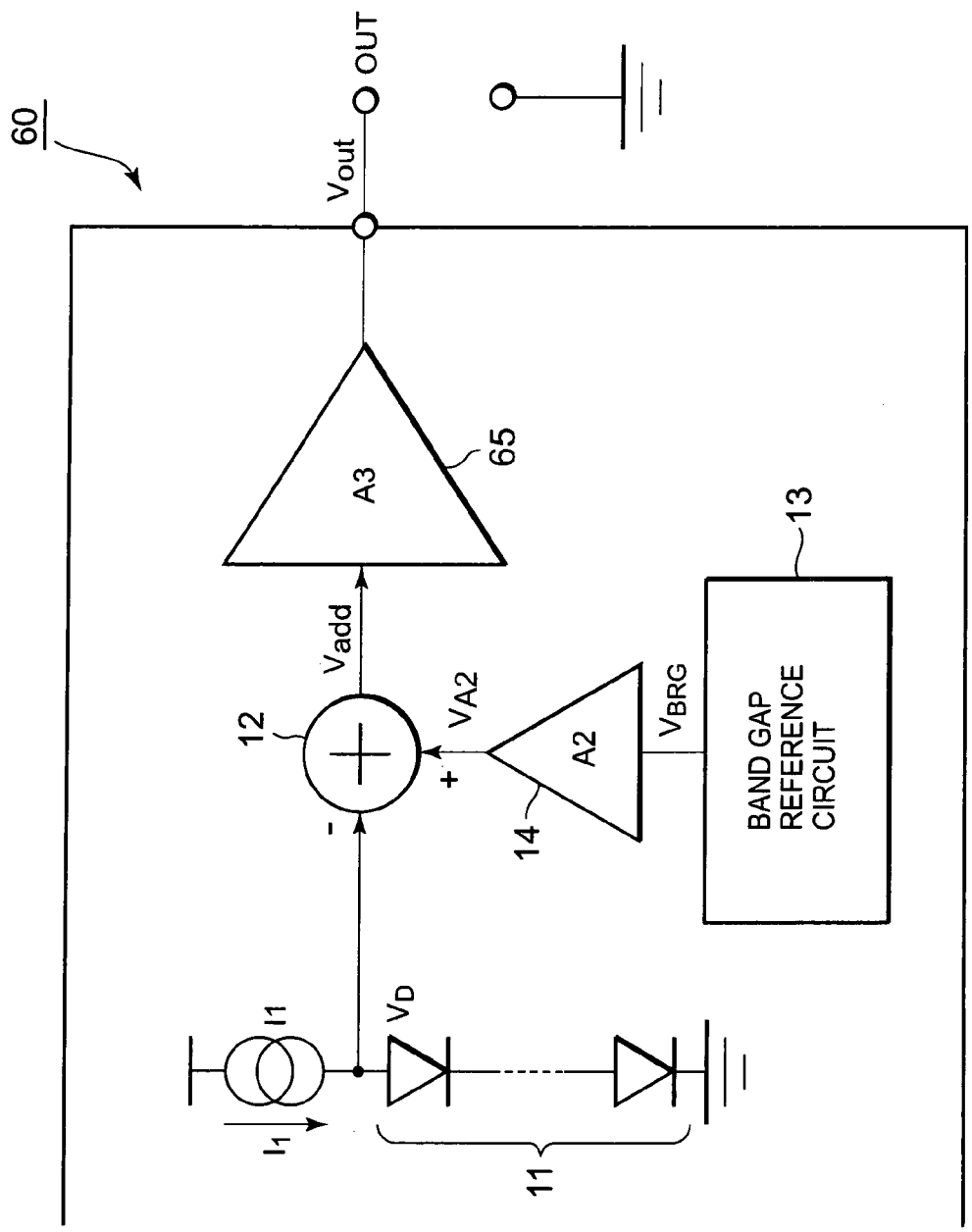
FIG. 10 is a block diagram showing a temperature detection circuit according to a third embodiment of the present invention.

Next, a third embodiment of the present invention will be described. FIG. 10 is a block diagram showing a temperature detection circuit according to the present embodiment. As shown in FIG. 10, a temperature detection circuit 60 according to the present embodiment is provided with an amplifier 65 in place of the amplifier 14 and the resistor R2 in the temperature detection circuit 10 shown in FIG. 1. Similarly to the first embodiment, the series voltage (comparison voltage) VD of a group of diodes 11 plurally connected in series biased by a constant current source I1 is minus added by an adder 12, and a voltage (reference voltage) VA2 amplifying a BGR voltage VBGR by the amplifier 14 is plus added. The output voltage of this adder 12 is amplified by an amplifier 65, and the amplified voltage is outputted from the output terminal OUT serving as the output terminal of the temperature detection circuit 60.

Next, the operation of the temperature detection circuit according to the present embodiment will be described. The basics operation is the same as the temperature detection circuit 10 of the first embodiment shown in FIG. 1. The temperature detection circuit 10 converts the output of the adder into the current once, and that current is again converted into the voltage by the resistor, whereas in the temperature detection circuit 60 in the present embodiment, the output of the adder 12 is amplified directly by the amplifier 65.

Figure 11:
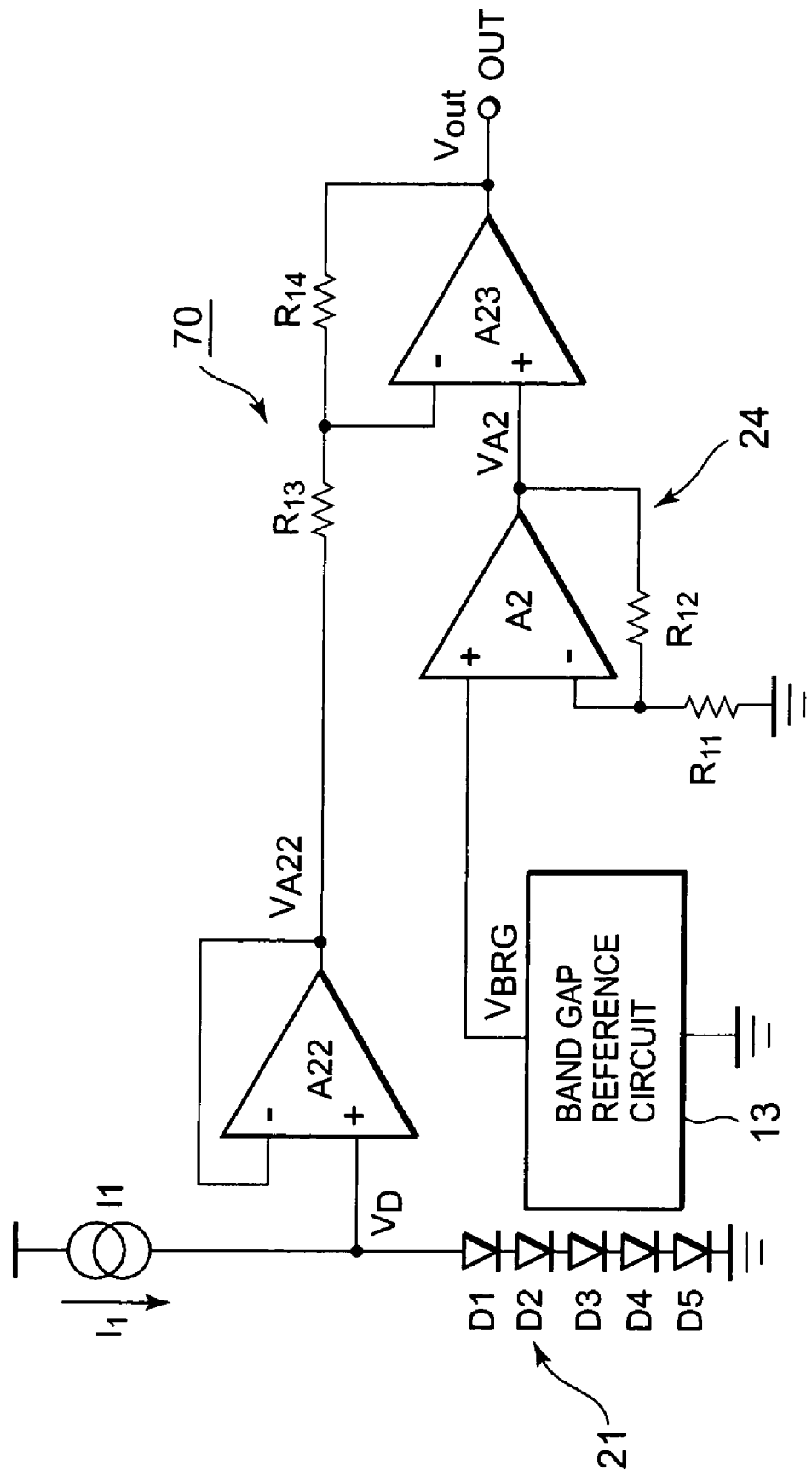
FIG. 11 is a circuit diagram showing the temperature detection circuit according to the specific example of the third embodiment of the present invention.

Next, a specific example in the present embodiment will be described. FIG. 11 is a circuit diagram showing the temperature detection circuit according the specific example of the present embodiment. The temperature detection circuit 70 comprises a group of diodes 21 consisting of five diodes D1 to D5 connected in series, a constant current source I1 biasing this group of diodes 21, a BGR circuit 13, and an amplifier 24 amplifying the BGR voltage. The amplifier 24 is configured by an operational amplifier A2, and first and second resistors R11 and R12 deciding a closed loop gain of the operational amplifier A2.

Further, the temperature detection circuit 70 according to the present embodiment is configured by an operational amplifier A22 voltage follower-connected to buffer the voltage of the group of diodes 21, a third operational amplifier A23, and third and fourth resistors R13 and R14 deciding the closed loop gain of the third operational amplifier A23. The operational amplifier A23 and the resistors R13 and R14 function as the adder 12 and the amplifier 65. The voltage follower connection means that the inverting input terminal and the output terminal of the operation amplifier are commonly connected and the input signal is inputted to the non-inverting input terminal. In this case, the operational amplifier outputs the same voltage as the inputted voltage in a voltage wise. That is, an operational amplifier (voltage follower) 22 outputs the same voltage as a comparison voltage VD serving as the input voltage.

The operational amplifier A2 has a non-inverting input terminal connected with the output of the BGR circuit 13, and has a first resistor R11 connected between the inverting input terminal and the GND, and has a second resistor R12 connected between the inverting input terminal and the output terminal. Further, the operational amplifier A22 has the non-inverting input terminal connected with the highest potential side of the group of diodes 21, and the inverting input terminal, as described above, is connected to the output terminal, thereby configuring a so-called voltage follower connection. The operational amplifier A23 has its non-inverting input terminal connected with the output terminal of the operational amplifier A2, and further, has a third resistor R13 connected between the inverting input terminal of the operational amplifier A23 and the output terminal of the operational amplifier A22. Between the inverting input terminal and the output terminal of the operational amplifier A23, a fourth resistor R14 is connected. The output terminal of the operation amplifier A23 becomes an output terminal OUT.

Next, the operation of the temperature detection circuit 70 will be described. When the output voltage of the BGR circuit 13 is taken as VBGR, the voltage VA2 of the output terminal of the operational amplifier A2 becomes the same as the formula (12). Further, when the voltage of the group of diodes 21 at certain temperatures T1 is taken as VD(T1), the value thereof becomes the same as the formula (13). Consequently, the output voltage VA22 of the operational amplifier A22 voltage follower-connected becomes also the same as the formula (13). Here, when the output voltage of the operational amplifier A23 is taken as Vout, the following formula is established.

[Formula 18]

$$V_{out} = V_{A2}\left(1 + \frac{R_{14}}{R_{13}}\right) - V_{A22}\frac{R_{14}}{R_{13}} \quad (18)$$

Consequently, this formula (18) becomes as follows from the formulas (12) and (13).

[Formula 19]

$$V_{out} = V_{BGR}\left(1 + \frac{R_{12}}{R_{11}}\right)\left(1 + \frac{R_{14}}{R_{13}}\right) - 5\frac{R_{14}}{R_{13}}\frac{k(273 + T_1)}{q}\ln\frac{I_1}{I_{S(T1)}} \quad (19)$$

Here, to set the output voltage Vout to become zero at the time of the temperature T1, the values of the resistors R11 to R14 may be set so as to become the first term=the second term in the formula (19). The temperature factor of the output voltage VOUT represented by this formula (19) becomes approximately −10 (mV/° C.) if five pieces of diode are connected in series because the temperature factor corresponding to one piece of the diode is approximately −2 (mV/° C.). Consequently, the temperature coefficient of the output voltage VOUT becomes as follows.

[Formula 20]

$$\frac{d}{dT}V_{out} \cong +10\frac{R_{14}}{R_{13}}(\text{mV/°C.}) \quad (20)$$

That is, the temperature detection circuit 70 according to the present embodiment can decide the temperature coefficient by a ratio of the resistors R13 and R14.

In the present embodiment, the comparison voltage generated by the group of diodes 11 or 21 is subtracted by the reference voltage amplifying the BGR voltage VBGR, thereby making it possible to maintain the accuracy of the output voltage VOUT, and even when there exists an error component in the temperature characteristics of the groups of diodes 11 or 21, such component can be removed. Further, by appropriately setting the resistor values of the resistors R13 and R14, the amplification factor can be reduced below 1, and consequently, the output voltage range does not surpass the input voltage range. As a result, when operating at high temperature, the chip is prevented from malfunction due to fully scaling out of the power supply voltage by the output voltage.

Fourth Embodiment

Figure 12:
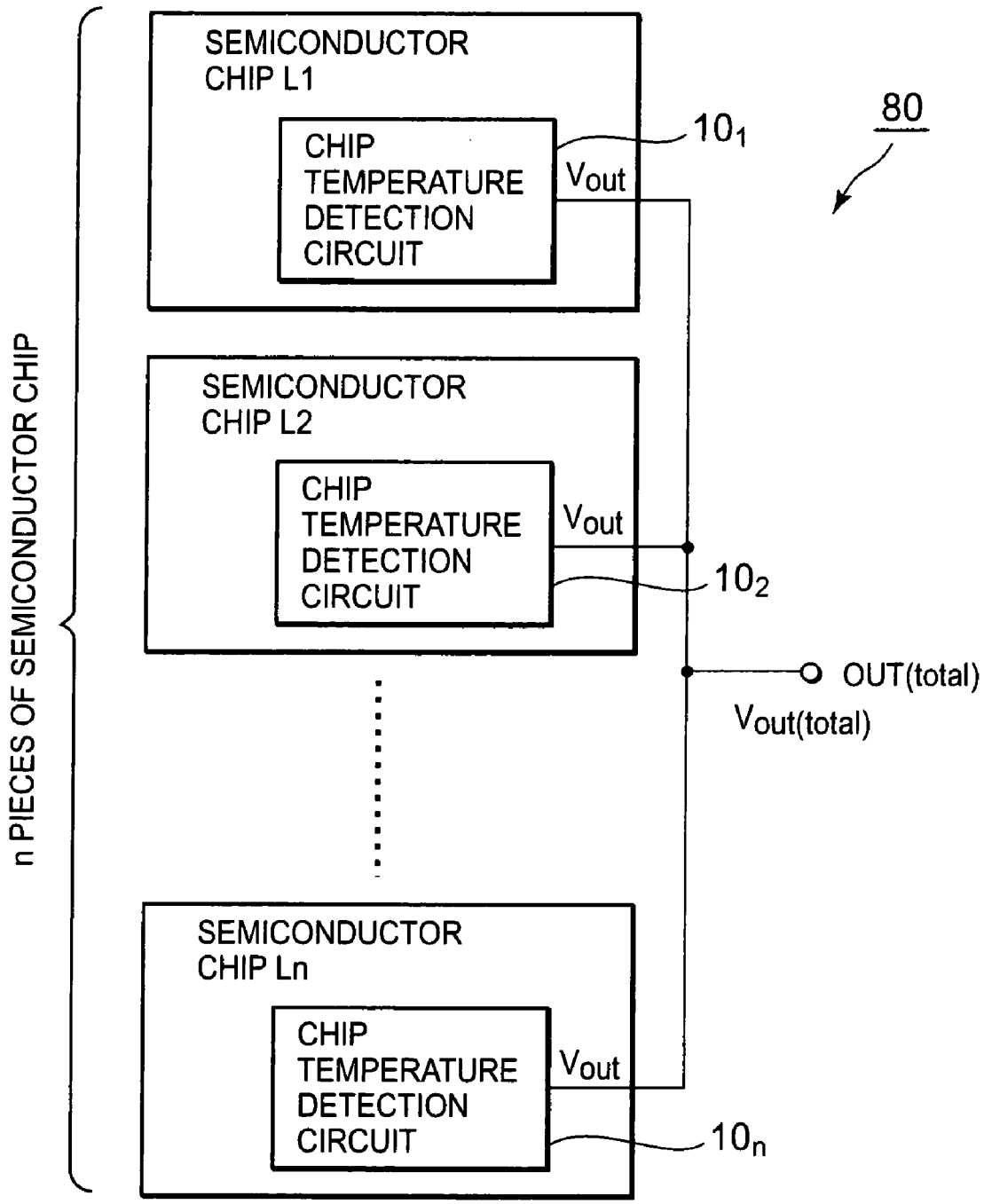
FIG. 12 is a block diagram showing a semiconductor device according to a fourth embodiment of the present invention.

Next, a fourth embodiment of the present invention will be described. FIG. 12 is a block diagram showing a semiconductor device according to the present invention. A semiconductor device 80 according to the present embodiment comprises n pieces of semiconductor chips L1 to Ln, and each semiconductor chip is mounted with a temperature detection circuit 10n similarly to the temperature detection circuit 10, for example, shown in FIG. 1. Each temperature detection circuit 10n has its output terminal commonly connected to output terminals OUT (total).

When the output terminals OUT (total) are commonly connected in this way, the current output shown by the formula (9) in each of the semiconductor chip Ln is added. That is, when the current output of each of the semiconductor chip Ln is taken as Iout (1) to Iout (n) and the added current value is taken as Iout (total), the following formula is established.

[Formula 21]

$$I_{out(total)} = \sum_{m=1}^{n} I_{out(m)} \quad (21)$$

Further, the resistor R2 shown in FIG. 1 becomes a parallel connection by commonly connecting n pieces of the semiconductor chip Ln. The resistor value R2 (total) of this parallel connection becomes as follows.

[Formula 22]

$$R_{2(total)} = \frac{1}{\sum_{m=1}^{n}\frac{1}{R_m}} \quad (22)$$

Consequently, the output voltage Vout (total) of the output terminals connected in parallel becomes as follows.

[Formula 23]

$$V_{out(total)} = I_{out(total)}R_{2(total)} = \frac{\sum_{m=1}^{n} I_{out(m)}}{\sum_{m=1}^{n}\frac{1}{R_m}} \quad (23)$$

This output voltage Vout (total) represents an average value of the temperatures of the individual semiconductor chips of the plurality of pieces. That is, the temperature detection circuit 10 is mounted on each of the plurality of semiconductor chips, and the output terminals are commonly connected, so that the average temperature of each semiconductor chip can be determined.

In the present embodiment, by using the temperature detection circuit 10 of a simple circuit configuration, a highly accurate output voltage corresponding to the temperature of the semiconductor chip can be obtained. The plurality of semiconductor chips are mounted with the temperature detection circuit 10, and only by implementing a wired-OR circuit connection on the output for each chip, the voltage output corresponding to the average value thereof can be obtained.

Fifth Embodiment

Figure 13:
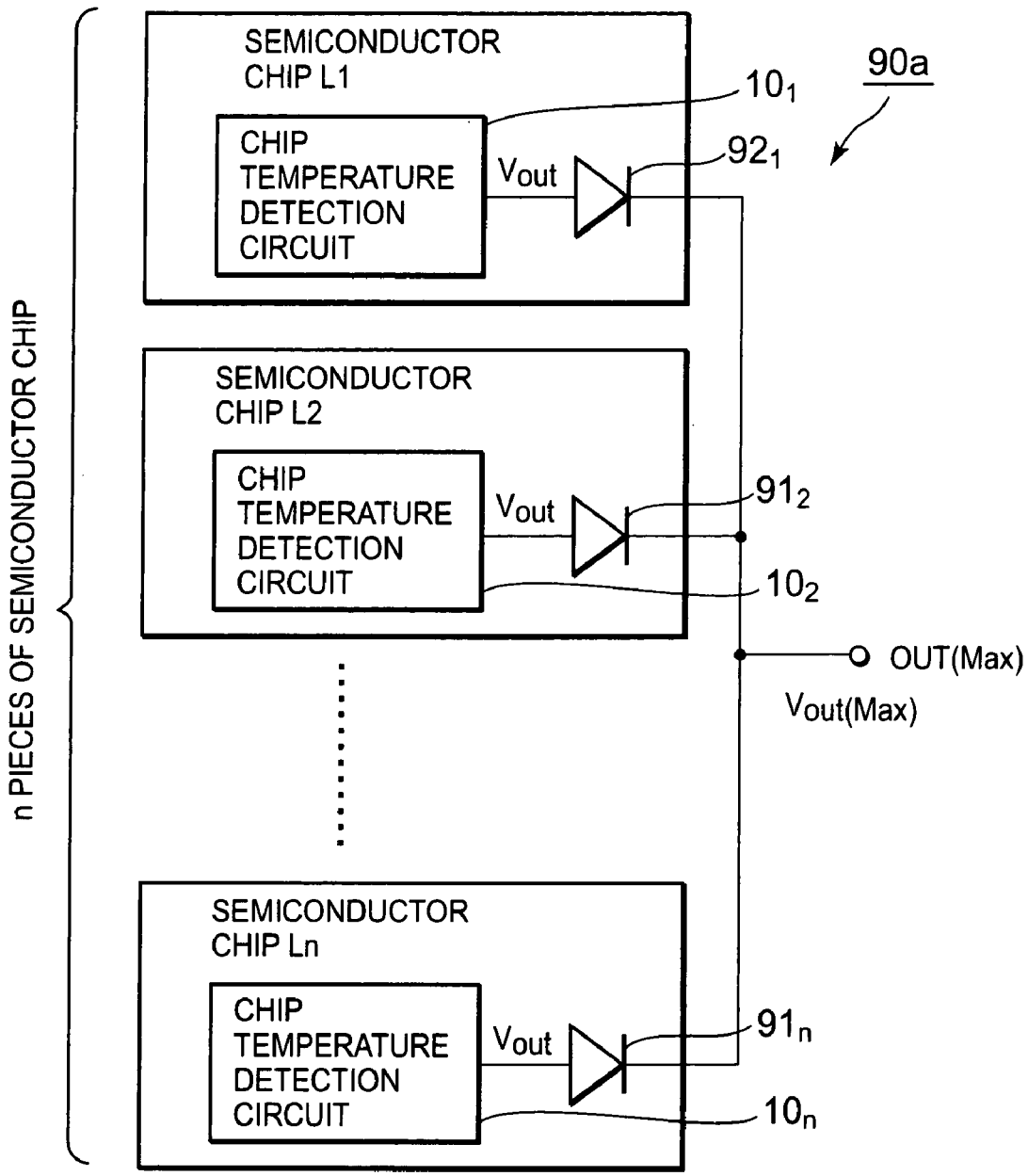
FIG. 13 is a block diagram showing a semiconductor device according to a fifth embodiment of the present invention.

FIG. 13 is a block diagram showing a semiconductor device according to a fifth embodiment of the present invention. A semiconductor device 90a according to the present embodiment comprises n pieces of semiconductor chips L1 to Ln, and each semiconductor chip Ln is mounted with a temperature detection circuit 10n similarly to the temperature detection circuit 10, for example, shown in FIG. 1. Each temperature detection circuit 10n is connected with a diode 91n for the maximum value detection in series with its output. Here, the diode 91n has its cathode connected to the output of the each temperature detection circuit 10n, and its anode connected to the temperature detection output terminal (not shown) of the semiconductor chip Ln, and its temperature detection output terminal of each semiconductor chip Ln commonly connected to the output terminal OUT (Max).

When the output terminal OUT (Max) is commonly connected through the diode 91n in this way, the output terminal OUT is outputted with a voltage value VOUT (Max) dropped by the forward voltage drop VF of the diode 91n from the maximum value from among the temperature detection outputs Vout of each semiconductor chip Ln. That is, these diodes 91n function as the maximum value detection circuit.

If this output value VOUT (Max) is used, a control adapted to the temperature of the semiconductor chip the highest in temperature from among all the semiconductor chips Ln can be made, and the reliability of the entire semiconductor device can be improved.

Sixth Embodiment

Figure 14:
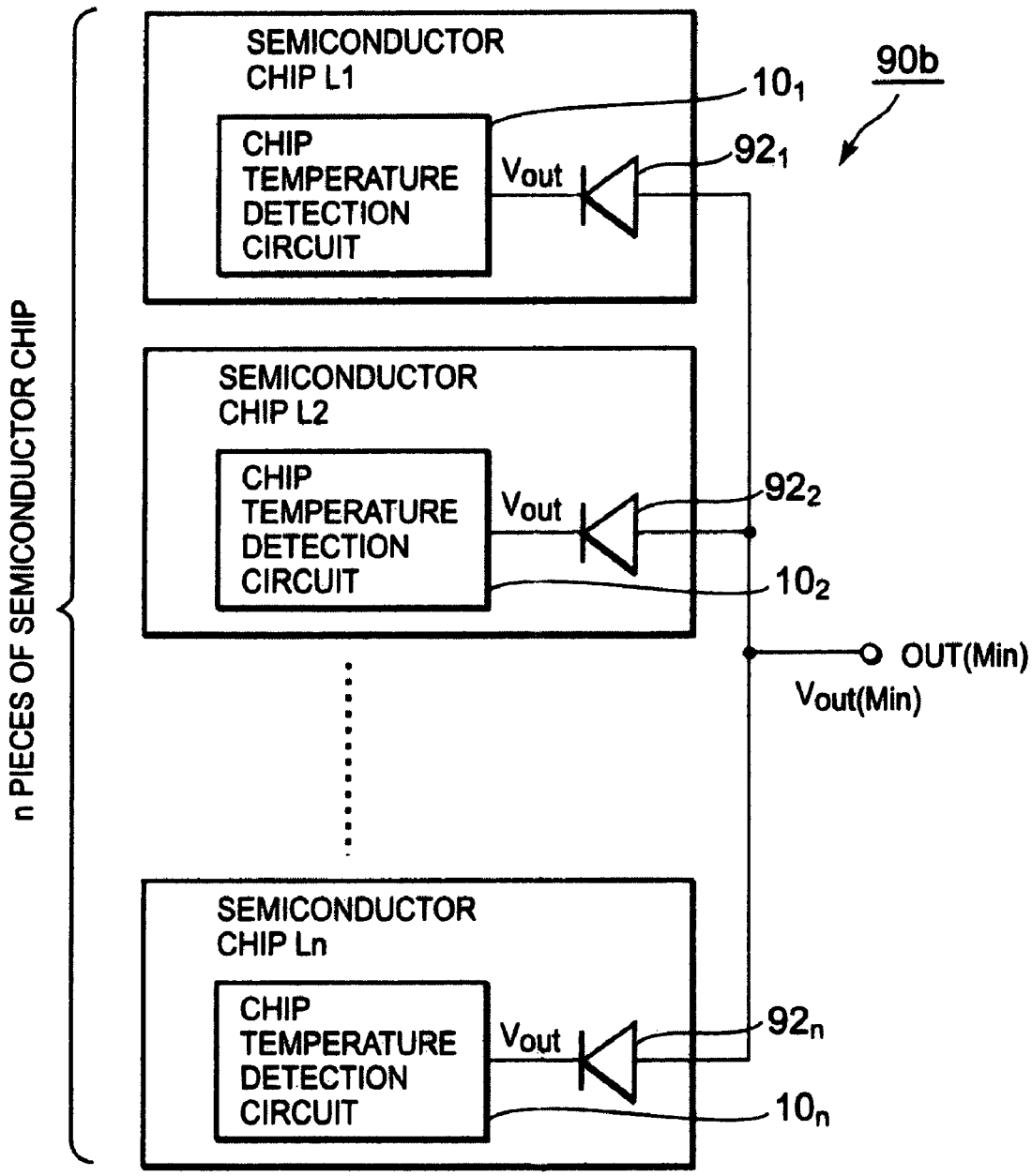
FIG. 14 is a block diagram showing a semiconductor device according to a sixth embodiment of the present invention.

FIG. 14 is a block diagram showing a semiconductor device according to a sixth embodiment of the present invention. A semiconductor device 90b according to the present embodiment comprises n pieces of semiconductor chips L1 to Ln, and each semiconductor chip Ln is mounted with a temperature detection circuit 10n similarly to the temperature detection circuit 10, for example, shown in FIG. 1. Each temperature detection circuit 10n is connected with a diode 92n for the minimum value detection in series with its output. Here, the diode 92n has its anode connected to the output of each temperature detection circuit 10n, and its cathode connected to the temperature detection output terminal of the semiconductor chip Ln, and its temperature detection output terminal of each semiconductor chip Ln commonly connected to the output terminal OUT (Min).

When the output terminal OUT (Min) is commonly connected through the diode 92n in this way, the output terminal OUT is outputted with a voltage value VOUT (Min) dropped by the forward voltage drop VF of the diode 92n from the minimum value from among the temperature detection outputs Vout of each semiconductor chip Ln. These diodes 92n function as the minimum value detection circuit.

If this output value VOUT (Min) is used, a control adapted to the semiconductor chip the lowest in temperature from among all the semiconductor chips Ln can be made, and, for example, a control for aligning the characteristics of the entire semiconductor device can be performed.

Seventh Embodiment

Figure 15:
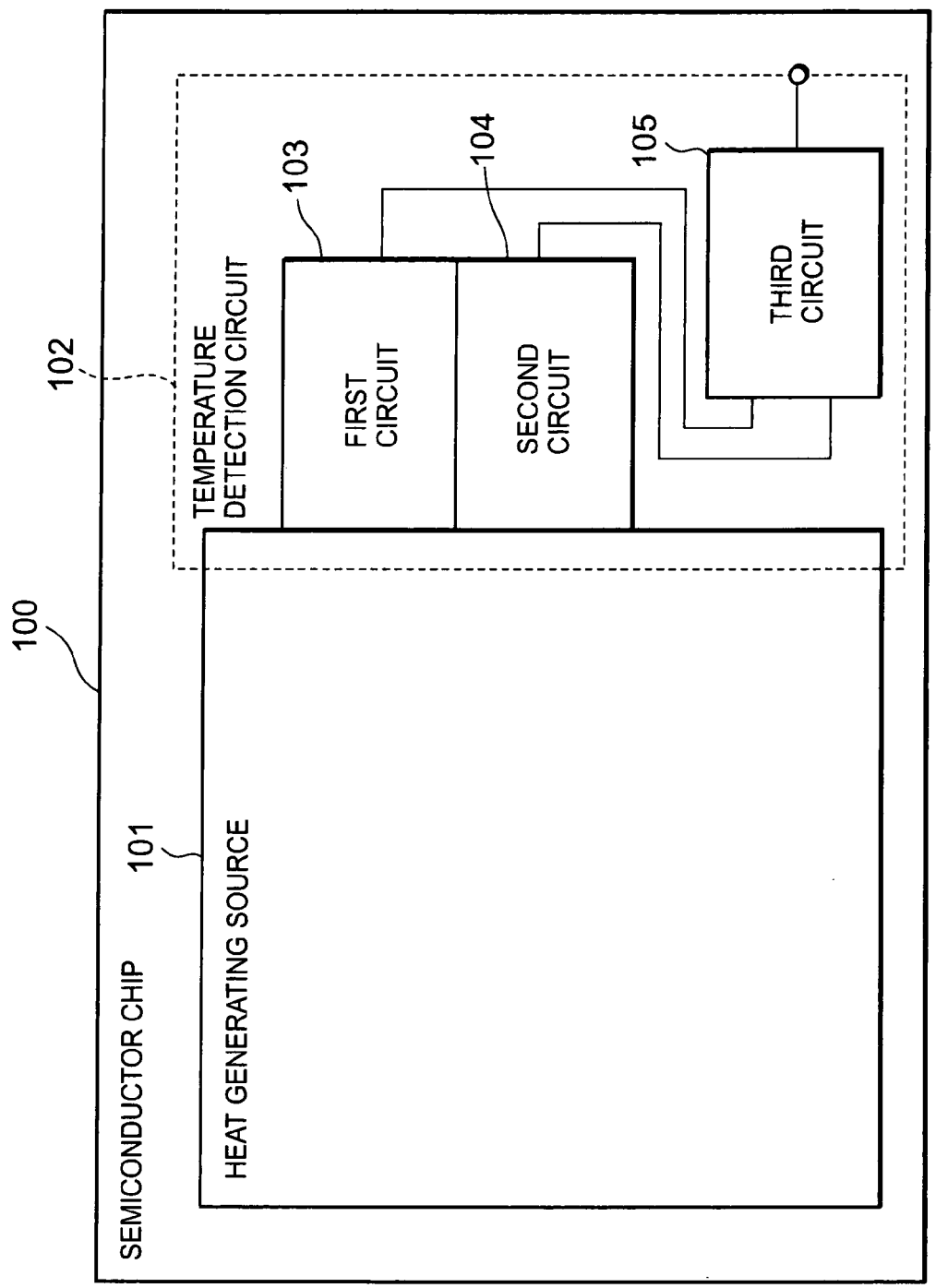
FIG. 15 is a schematic diagram of a chip layout of the semiconductor chip mounted with the temperature detection circuit according to a seventh embodiment of the present invention.

FIG. 15 is a schematic diagram of the chip layout of a semiconductor chip mounted with a temperature detection circuit according to a seventh embodiment of the present invention. In the vicinity of a heat generating source 101 on a semiconductor chip 100, a temperature detection circuit 102 is disposed. The temperature detection circuit 102 comprises a first circuit 103, a second circuit 104, and a third circuit 105. The first circuit 103 and the second circuit 104 output output-signals having monotonic temperature dependency, and the temperature dependency of the second circuit 104 is smaller than the temperature dependency of the first circuit 103. Here, the first circuit 103, for example, is configured by a group of diodes 11 and a constant current source I1 shown in FIG. 1, and generates the output signal according to environment temperature. Further, the second circuit is configured by the BGR circuit 13 and the amplifier 14 shown in FIG. 1, and generates, for example, a reference voltage as a signal serving as a reference. Further, the third circuit is configured by the output unit shown in FIG. 1 and outputs an output signal according to a difference between the output signal of the first circuit 103 and the output signal of the second circuit 104. In the present embodiment, these first circuit 103 and second circuit 104 are disposed in the vicinity of the heat generating source 101. The third circuit may be disposed at any area as it is hardly affected by environment temperature.

The configuration in which both of the first circuit 103 and the second circuit 104 are disposed respectively in the vicinity of the heat generating source 101 in the temperature detection circuit 102 is particularly suitable for the case where the area occupied by the heat generating source 101 on the semiconductor chip 100 is large and the entire surface of the chip rises in temperature. In the present embodiment, by disposing both the first circuit 103 and the second circuit 104 respectively in the vicinity of the heat generating source 101, the environment temperatures of the two circuits can be treated approximately as the same temperature.

Eighth Embodiment

Figure 16:
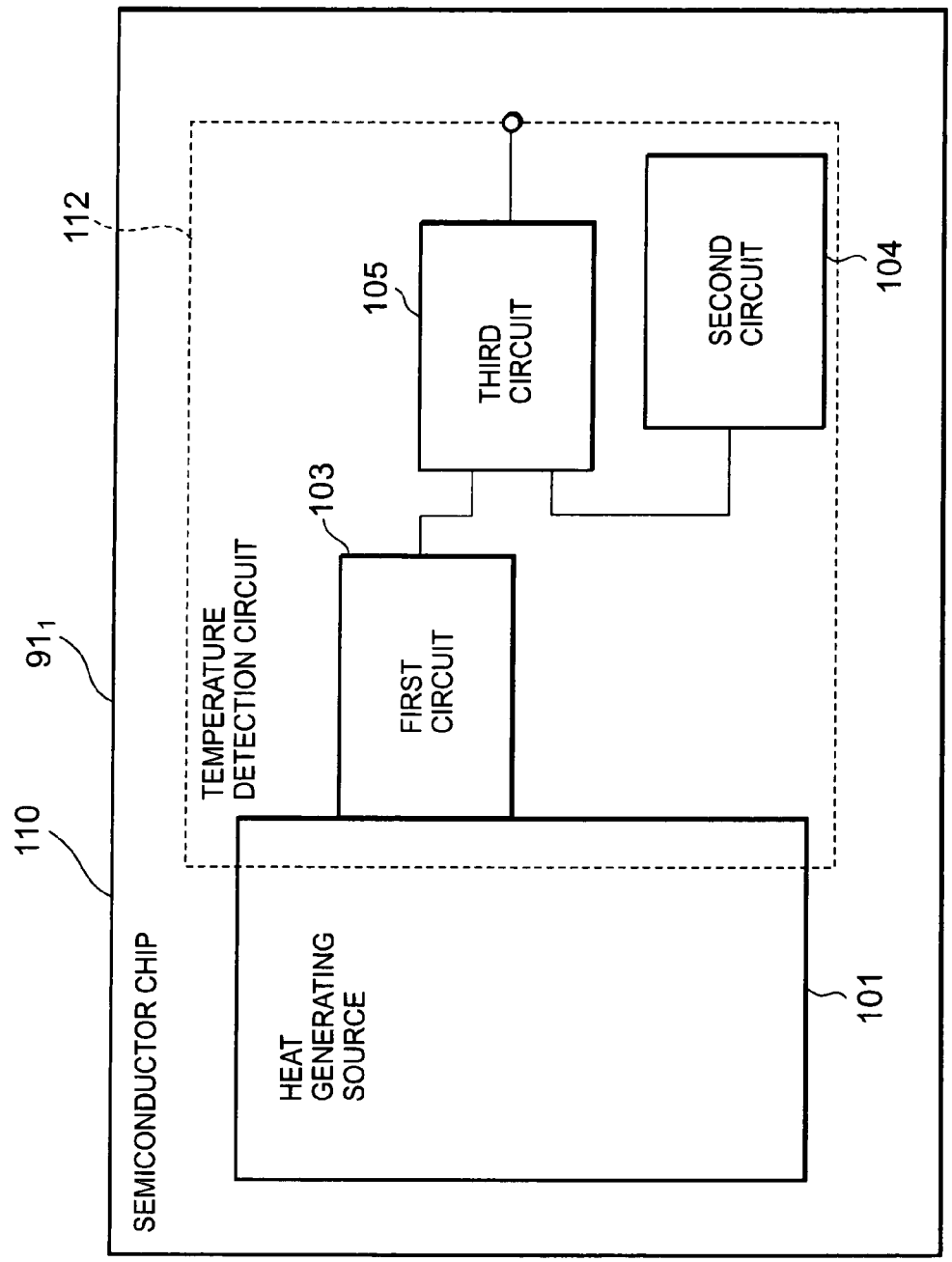
FIG. 16 is a schematic diagram of a chip layout of the semiconductor chip mounted with the temperature detection circuit according to an eighth embodiment of the present invention.
Figure 17:
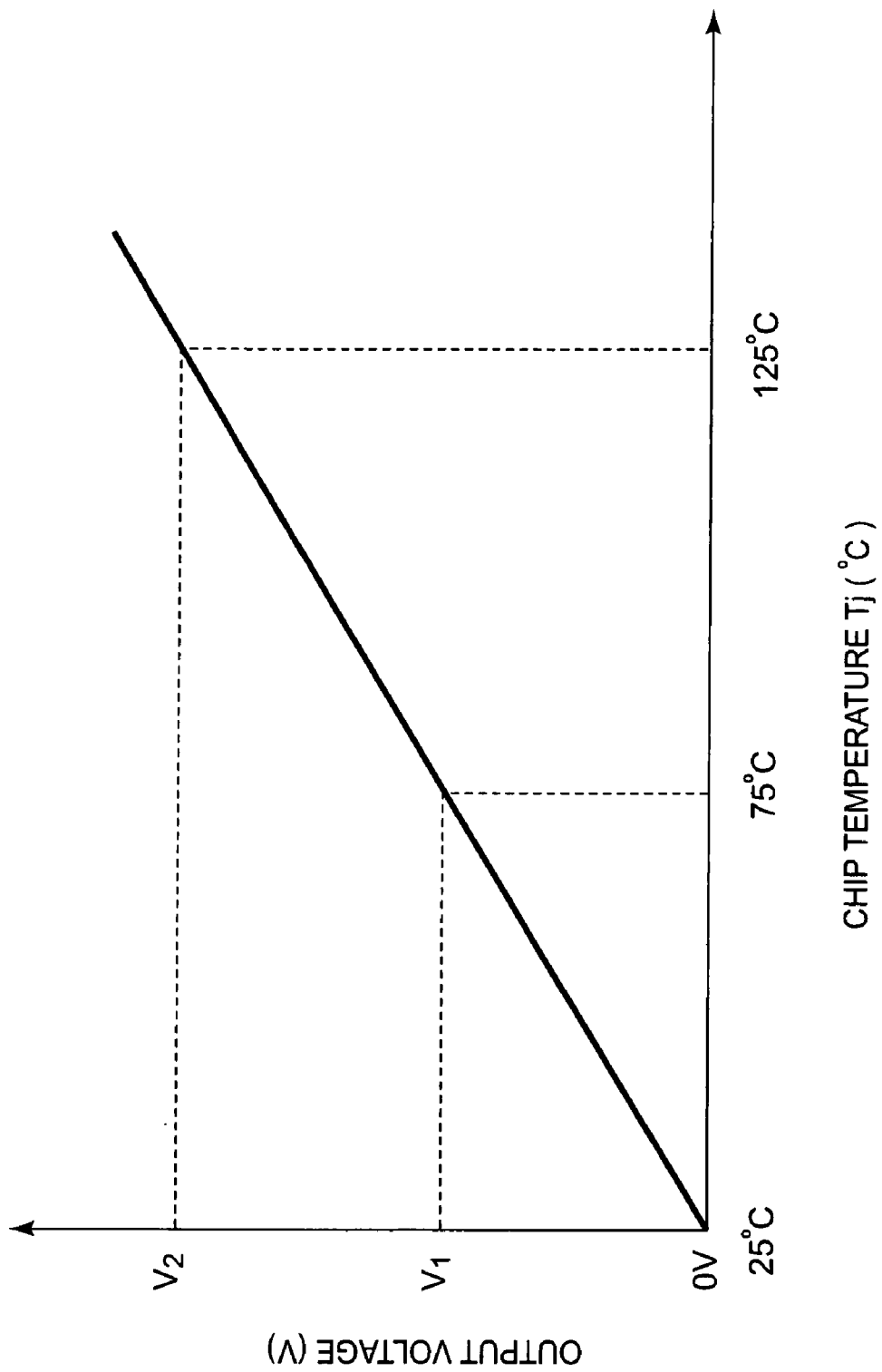
FIG. 17 is a graphic view showing the case where the chip temperature and the output voltage is in a directly proportional relationship.
Figure 18:
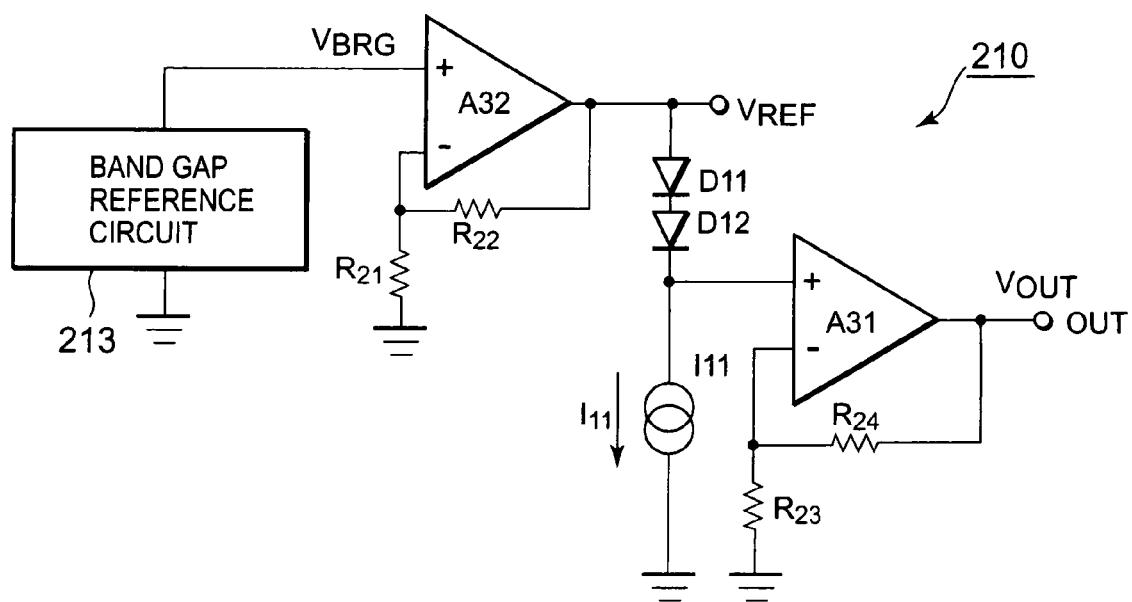
FIG. 18 is a circuit diagram showing the temperature detection circuit disclosed in Japanese Patent Laid-Open No. 11-258065.

FIG. 16 is a schematic diagram of a chip layout of a semiconductor chip mounted with a temperature detection circuit according to an eighth embodiment of the present invention. Incidentally, in FIG. 16, the same component parts as the semiconductor chip shown in FIG. 15 are attached with the same reference numerals, and the detailed description thereof will be omitted. In the present embodiment, similarly to the seventh embodiment, in the vicinity of a heat generating source 101 on a semiconductor chip 110, a first circuit 103 is disposed. On the other hand, a second circuit 104 is disposed at a position preferably isolated from the heat generating source 101. Incidentally, a third circuit 105 may be disposed either in the vicinity of or at a position isolated from the heat generating source 101 as the circuit is hardly affected by the environment temperature.

The configuration in which the first circuit 103 is disposed in the vicinity of the heat generating source 101 and the second circuit 104 is disposed at a position isolated as much as possible from the heat generating source 101 in the temperature detection circuit 112 is particularly suitable for the case where the area occupied by the heat generating source 101 on the semiconductor chip 110 is small and the temperature variations of the chip 110 is large, and the temperature rise of a part of the area is higher than the other area. In the present embodiment, the first circuit 103 is placed approximately in the same environment temperature as the heat generating source 101, and the second circuit 104 can enhance the output accuracy of a temperature detection circuit 112 by further reducing the variations of the environment temperature.

Incidentally, the present invention is not limited to the above described embodiments, and needless to mention, can be variously modified without departing from the spirit and the scope of the invention. For example, in the fourth embodiment, though a description has been made that the semiconductor chip is mounted with the temperature detection circuit 10, even when the temperature detection circuits 20, 30 or 40 are mounted, the same effect can be obtained. Further, in the present embodiment, though a description has been made that the voltage according to the detection temperature is outputted, the current may be outputted.

What is claimed is:
1. A temperature detection circuit, comprising:
one or more diodes connected in series;
a constant current source connected to said one or more diodes; and
an output unit for outputting a voltage or a current according to a voltage difference between a comparison volt- age generated by said one or more diodes, such that said comparison voltage changes with a temperature change of said one or more diodes, and a reference voltage, said reference voltage comprising a constant voltage, wherein said output unit comprises a subtracter for subtracting said comparison voltage from said reference voltage, said subtracter includes a first operational amplifier in which an inverting input terminal is connected to the reference voltage and a non-inverting input terminal is connected to said comparison voltage, a voltage current converter for converting an output voltage of said subtracter into a current, and a current voltage converter for converting the current outputted from said voltage current converter into a voltage, and wherein said output unit does not output the voltage or the current until a predetermined temperature, and outputs the voltage or the current proportional to a voltage difference between the reference voltage and the comparison voltage generated by the temperature from the predetermined temperature.

2. The temperature detection circuit according to claim 1, wherein said output unit further comprises:

a first resistor applied with said reference voltage at one end;

a voltage current converting circuit connected to said first operational amplifier and converting a voltage subtracting said comparison voltage from said reference voltage into a current;

a first current mirror circuit in which the input terminal is connected with said voltage current converting circuit and a common terminal is inputted with a power supply voltage; and a second resistor in which one end is connected between said first current mirror circuit and an output terminal and an other end is grounded, wherein, in said first operational amplifier, the inverting input terminal is connected to an other end of said first resistor and said non-inverting input terminal is inputted with said comparison voltage.

3. The temperature detection circuit according to claim 2, wherein said first operational amplifier comprises first and second transistors configuring a differential pair and an output transistor controlled by said first or second transistor, and comprises an offset cancellation function for switching a first mode in which first and second inputs are inputted to said first and second transistors respectively, and based on the output of the said first transistor, said output transistor is controlled, and a second mode in which said first and second inputs are inputted to said second and first transistors respectively, and based on the output of said second transistor, said output transistor is controlled.

4. The temperature detection circuit according to claim 2, wherein said voltage current converting circuit comprises a second current mirror circuit, in which the input terminal is connected with the inverting input terminal of said first operational amplifier and a common terminal is connected with the output terminal of said first operational amplifier.

5. The temperature detection circuit according to claim 2, wherein said voltage current converting circuit comprises a third transistor and a fourth transistor commonly connected with a control terminal, and the output terminal of said first operational amplifier is connected with a control terminal of said third transistor, and said current is outputted from said fourth transistor.

6. The temperature detection circuit according to claim 3, wherein said output unit further includes a low pass filter, and outputs a voltage according to said detection temperature from the low pass filter.

7. The temperature detection circuit according to claim 1, further comprising a band gap reference circuit and a second operational amplifier amplifying a band gap reference voltage outputted from said band gap reference circuit and generating said reference voltage.

8. The temperature detection circuit according to claim 7, wherein said second operational amplifier comprises first and second transistors configuring a differential pair and an output transistor controlled by said first or second transistor, and comprises an offset cancellation function for switching a mode in which the first and second inputs are inputted to said first and second transistors respectively, and based on the output of said first transistor, said output transistor is controlled, and a mode in which said first and second inputs are inputted to said second and first transistors respectively, and based on the output of said second transistor, said output transistor is controlled.

9. The temperature detection circuit according to claim 1, wherein said output unit further comprises an amplifier for amplifying the output voltage of said subtracter.

10. The temperature detection circuit according to claim 1, further comprising:

a voltage follower taking said comparison voltage as an input voltage;

a band gap reference circuit; and a second operational amplifier for amplifying a band gap reference voltage outputted from said band gap reference circuit and generating said reference voltage, wherein said output unit further comprises:

a third resistor in which one end is connected to the output of said voltage follower;

a third operational amplifier in which an other end of said third resistor is connected to the inverting input terminal, and said reference voltage is inputted to a non-inverting input terminal; and a fourth resistor connected between the output terminal and the inverting input terminal of said third operational amplifier.

11. The temperature detection circuit according to claim 1, wherein, when said output unit is in the predetermined temperature, said comparison voltage and said reference voltage comprise the same voltage.

12. A semiconductor device having a plurality of chips mounted with a temperature detection circuit, said temperature detection circuit having each output terminal commonly connected, comprising:

one or more diodes connected in series;

a constant power supply source connected to said one or more diodes;

a voltage current converter which does not output a voltage or a current until a predetermined temperature, and outputs the voltage or the current proportional to a voltage difference between a reference voltage and a comparison voltage generated by said one or more diodes generated by the temperature from the predetermined temperature, the voltage current converter including a first operational amplifier in which an inverting input terminal is connected to the reference voltage and a non-inverting input terminal is connected to said comparison voltage; and a resistor in which one end is connected between said voltage current converter and said output terminal and an other end is grounded.

13. A semiconductor device, comprising a plurality of chips mounted with a temperature detection circuit; and
a maximum value/minimum value detection circuit connected to a plurality of said temperature detection circuits,
wherein said temperature detection circuit comprises:
one or more temperature detection diodes connected in series;
a constant current source connected to said one or more temperature detection diodes; and
an output unit which does not output a voltage or a current until a predetermined temperature, and outputs the voltage or the current proportional to a voltage difference between a reference voltage and a comparison voltage generated by said one or more diodes generated by the temperature from the predetermined temperature, the output unit including a first operational amplifier in which an inverting input terminal is connected to the reference voltage and a non-inverting input terminal is connected to said comparison voltage,
wherein said maximum value/minimum value detection circuit outputs the minimum value or the maximum value from among the output voltages of said plurality of temperature detection circuits.

14. A temperature detection circuit, comprising:
a first circuit for outputting an output signal including a temperature dependency;
a second circuit for outputting a constant output signal; and
an operational amplifier for inputting an output signal of said first circuit to one end, and an output signal of said second circuit to an other end through a resistor;
wherein said operational amplifier comprises a subtracter for subtracting a comparison voltage from a reference voltage, a voltage current converter for converting an output voltage of said subtracter into a current, and a current voltage converter for converting a current outputted from said voltage current converter into a voltage, where, in said operational amplifier, an inverting input terminal is connected to the reference voltage and a non-inverting input terminal is connected to said comparison voltage, and
wherein the operational amplifier does not output an output signal until a predetermined temperature, and outputs an output signal proportional to a difference in potential of said resistor by a temperature from the predetermined temperature.

15. The temperature detection circuit according to claim 14, wherein said first circuit includes the diode.

16. The temperature detection circuit according to claim 14, wherein said second circuit includes a band gap reference circuit.

17. The temperature detection circuit according to claim 14, wherein said first circuit and said second circuit are disposed in the vicinity of a heat generating source.

18. The temperature detection circuit according to claim 14, wherein said first circuit is disposed in the vicinity of the heat generating source, and said second circuit is disposed at a position isolated from said heat generating source.

19. The temperature detection circuit according to claim 14, wherein the output signal of the first circuit and the output signal of the second circuit in the predetermined temperature are made the same signal.

20. A method of detecting a temperature of a semiconductor chip, comprising:
applying a constant voltage independent from varying the temperature of said semiconductor chip to one end of a resistor;
applying a comparison voltage to an other end of said resistor, said comparison voltage being generated from an element formed in said semiconductor chip and varying based on the temperature of said semiconductor chip;
producing a current flowing said resistor, such that the constant voltage is subtracted from the comparison voltage, said current not flowing until a predetermined temperature, and flowing proportional to a difference in potential of said resistor by a temperature from the predetermined temperature; and
producing a monitor voltage in accordance with said current, said monitor voltage depending on the temperature of said semiconductor chip.

* * * * *